United States Patent
Kanai et al.

(10) Patent No.: US 9,354,923 B2
(45) Date of Patent: May 31, 2016

(54) INFORMATION PROCESSING APPARATUS, INFORMATION PROCESSING METHOD, AND COMPUTER PROGRAM PRODUCT

(71) Applicant: Kabushiki Kaisha Toshiba, Minato-ku (JP)

(72) Inventors: Jun Kanai, Inagi (JP); Hiroshi Isozaki, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 317 days.

(21) Appl. No.: 14/198,029

(22) Filed: Mar. 5, 2014

(65) Prior Publication Data
US 2014/0372651 A1 Dec. 18, 2014

(30) Foreign Application Priority Data
Jun. 18, 2013 (JP) .................................. 2013-127647

(51) Int. Cl.
G06F 9/42 (2006.01)
G06F 9/46 (2006.01)
G06F 13/24 (2006.01)

(52) U.S. Cl.
CPC ................ *G06F 9/462* (2013.01); *G06F 13/24* (2013.01)

(58) Field of Classification Search
CPC ........ G06F 9/462; G06F 21/74; G06F 9/4555
USPC .................... 710/261; 718/100, 108
See application file for complete search history.

(56) References Cited

U.S. PATENT DOCUMENTS

| | | | | |
|---|---|---|---|---|
| 4,493,034 A * | 1/1985 | Angelle | ................ | G06F 9/4843 713/100 |
| 6,711,605 B2 * | 3/2004 | Sekiguchi | ............. | G06F 9/4843 713/1 |
| 6,996,828 B1 * | 2/2006 | Kimura | ............... | G06F 9/45537 718/102 |
| 7,325,083 B2 * | 1/2008 | Watt | ...................... | G06F 9/4812 710/261 |
| 7,503,049 B2 * | 3/2009 | Kanemura | ............. | G06F 9/441 710/200 |

(Continued)

FOREIGN PATENT DOCUMENTS

| | | |
|---|---|---|
| JP | 10-171670 | 6/1998 |
| JP | 11-312092 | 11/1999 |
| JP | 2003-50705 | 2/2003 |

OTHER PUBLICATIONS

U.S. Appl. No. 14/150,157, filed Jan. 8, 2014, Hiroshi Isozkai, et al.

*Primary Examiner* — Paul R Myers
(74) *Attorney, Agent, or Firm* — Oblon, McClelland, Maier & Neustadt, L.L.P.

(57) ABSTRACT

According to an embodiment, an information processing apparatus includes a banked register determiner and a saving register determiner. The banked register determiner is configured to hold register information indicating which of a banked register and a non-banked register a register which is used by the operating system is, receive an acquisition instruction for the non-banked or banked register and the information about the mode of the operating system, and return a list of the non-banked or banked registers. The saving register determiner is configured to acquire the mode in which the operating system is capable of operating, determine that saving of the banked register for the mode is necessary when another operating system is capable of operating in the mode, acquire a list of the banked registers, and acquire a list of the non-banked registers from the banked register determiner.

18 Claims, 27 Drawing Sheets

(56) References Cited

U.S. PATENT DOCUMENTS 8,898,666 B2* 11/2014 Saito .................... G06F 9/5077 718/1

2008/0155542 A1* 6/2008 Maigne ................. G06F 9/4555 718/100
2012/0297177 A1* 11/2012 Ghosh .................... G06F 21/53 713/2

* cited by examiner

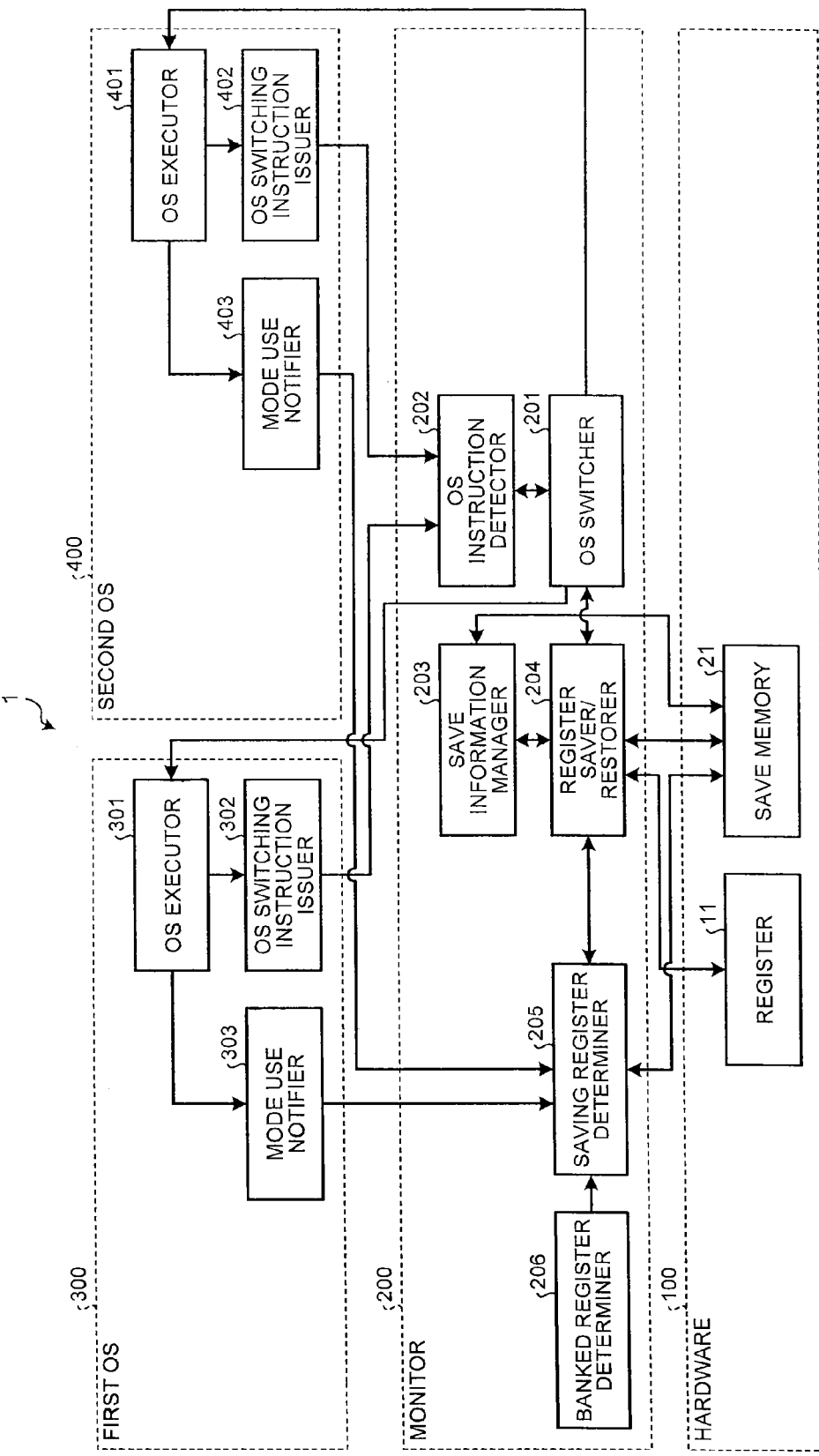

FIG.5

| OS | MODE | MODE USE | CONTEXT SAVE AREA | PREVIOUS SAVE |
|---|---|---|---|---|
| FIRST OS | NON-BANKED | -- | R0=0, R1=0,..., RETURN DESTINATION=X | -- |
| | SVC MODE | YES | R13=0, R14=0, StatusRegister=0 | NO |
| | USR MODE | NO | EMPTY | NO |
| | IRQ MODE | YES | EMPTY | NO |
| | FIQ MODE | NO | EMPTY | NO |
| SECOND OS | NON-BANKED | -- | R0=0, R1=0,..., RETURN DESTINATION=Y | -- |
| | SVC MODE | YES | R13=0, R14=0, StatusRegister=0 | NO |
| | USR MODE | YES | EMPTY | NO |
| | IRQ MODE | NO | EMPTY | NO |
| | FIQ MODE | NO | EMPTY | NO |

FIG.7

| OS | MODE | MODE USE | CONTEXT SAVE AREA | PREVIOUS SAVE |
|---|---|---|---|---|
| FIRST OS | NON-BANKED | -- | R0=A, R1=B,..., RETURN DESTINATION=X | -- |
| | SVC MODE | YES | R13=X, R14=Y, StatusRegister=Y | YES |
| | USR MODE | NO | EMPTY | NO |
| | IRQ MODE | YES | EMPTY | NO |
| | FIQ MODE | NO | EMPTY | NO |
| SECOND OS | NON-BANKED | -- | R0=0, R1=0,..., RETURN DESTINATION=Y | -- |
| | SVC MODE | YES | R13=0, R14=0, StatusRegister=0 | NO |
| | USR MODE | YES | EMPTY | NO |
| | IRQ MODE | NO | EMPTY | NO |
| | FIQ MODE | NO | EMPTY | NO |

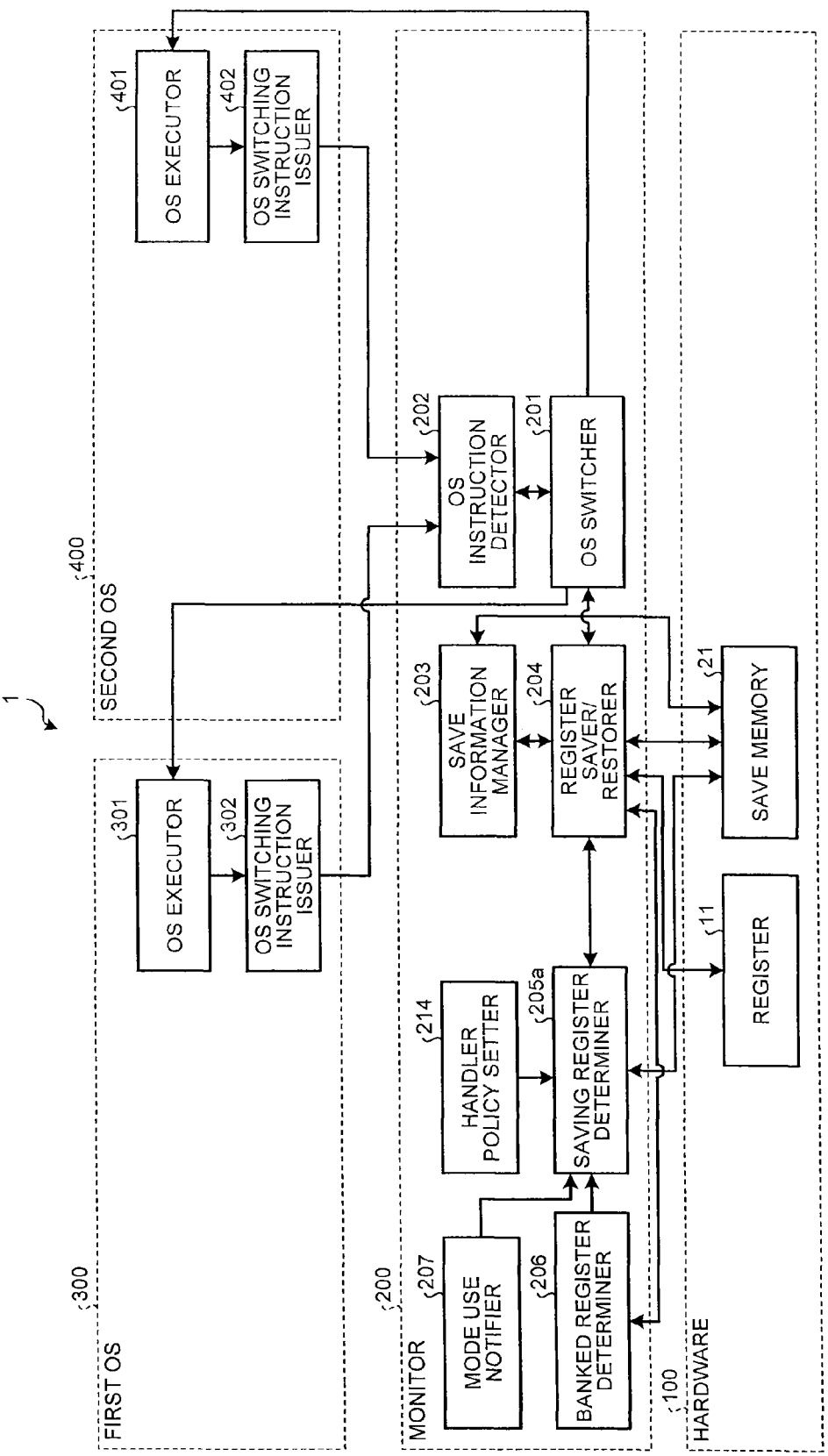

FIG.9

| OS | MODE | MODE USE | HANDLER POLICY | CONTEXT SAVE AREA | PREVIOUS SAVE |
|---|---|---|---|---|---|
| FIRST OS | NON-BANKED | -- | -- | R0=A, R1=B...., RETURN DESTINATION=X | -- |
| | SVC MODE | YES | INTERRUPTED | R13=X, R14=Y, StatusRegister=Y | YES |
| | USR MODE | NO | INTERRUPTED | EMPTY | NO |
| | IRQ MODE | YES | NO INTERRUPTION | EMPTY | NO |
| | FIQ MODE | NO | NO INTERRUPTION | EMPTY | NO |
| SECOND OS | NON-BANKED | -- | -- | R0=0, R1=0...., RETURN DESTINATION=Y | -- |
| | SVC MODE | YES | INTERRUPTED | R13=0, R14=0, StatusRegister=0 | NO |
| | USR MODE | YES | INTERRUPTED | EMPTY | NO |
| | IRQ MODE | NO | NO INTERRUPTION | EMPTY | NO |
| | FIQ MODE | NO | -- | EMPTY | NO |

FIG.10

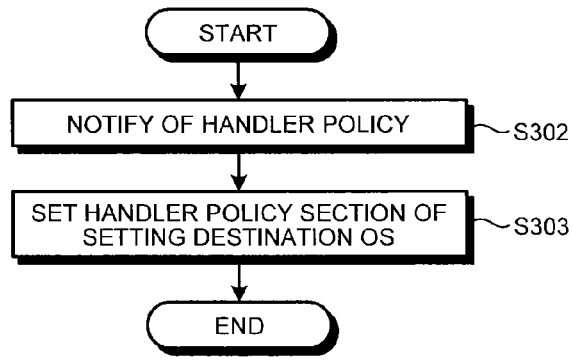

FIG.13

| OS | MODE | INTERRUPT STATE | CONTEXT SAVE AREA | PREVIOUS SAVE |
|---|---|---|---|---|
| FIRST OS | NON-BANKED | — | R0=A, R1=B.... | — |
| | SVC MODE | — | R13=X, R14=Y, StatusRegister=Y | YES |
| | USR MODE | — | EMPTY | NO |
| | IRQ MODE | COMPLETE | EMPTY | NO |
| | FIQ MODE | PROCESSING | EMPTY | NO |
| SECOND OS | NON-BANKED | — | R0=0, R1=0.... | — |
| | SVC MODE | — | R13=0, R14=0, StatusRegister=0 | NO |
| | USR MODE | — | EMPTY | NO |
| | IRQ MODE | COMPLETE | EMPTY | NO |
| | FIQ MODE | INVALID | EMPTY | NO |

FIG.18

| OS | MODE | MODE USE | HANDLER POLICY | INTERRUPT STATE | CONTEXT SAVE AREA | PREVIOUS SAVE |
|---|---|---|---|---|---|---|
| FIRST OS | NON-BANKED | -- | -- | -- | R0=A, R1=B.... | -- |
| | SVC MODE | YES | INTERRUPTED | -- | R13=X, R14=Y, StatusRegister=Y | YES |
| | USR MODE | NO | INTERRUPTED | -- | EMPTY | NO |
| | IRQ MODE | YES | DESTRUCTION ENABLED | COMPLETE | EMPTY | NO |
| | FIQ MODE | YES | DESTRUCTION ENABLED | PROCESSING | EMPTY | NO |
| SECOND OS | NON-BANKED | -- | -- | -- | R0=0, R1=0.... | -- |
| | SVC MODE | YES | INTERRUPTED | -- | R13=0, R14=0, StatusRegister=0 | NO |
| | USR MODE | YES | INTERRUPTED | -- | EMPTY | NO |
| | IRQ MODE | YES | DESTRUCTION DISABLED | COMPLETE | EMPTY | NO |
| | FIQ MODE | NO | -- | INVALID | EMPTY | NO |

FIG.21

| OS | MODE | MODE USE | HANDLER POLICY | INTERRUPT STATE | CONTEXT SAVE AREA | PREVIOUS SAVE |
|---|---|---|---|---|---|---|
| FIRST OS | NON-BANKED | -- | -- | (CORE 1) -- | R0=A, R1=B.... | -- |
| | | | | (CORE 2) -- | R0=C, R1=D.... | -- |
| | SVC MODE | YES | INTERRUPTED | (CORE 1) -- | R13=X, R14=Y, StatusRegister=Y | YES |
| | | | | (CORE 2) -- | EMPTY | NO |
| | USR MODE | NO | INTERRUPTED | (CORE 1) -- | EMPTY | NO |
| | | | | (CORE 2) -- | EMPTY | NO |
| | IRQ MODE | YES | DESTRUCTION ENABLED | (CORE 1) COMPLETE | EMPTY | NO |
| | | | | (CORE 2) COMPLETE | R13=x, R14=y, StatusRegister=z | YES |
| | FIQ MODE | YES | DESTRUCTION ENABLED | (CORE 1) PROCESSING | EMPTY | NO |
| | | | | (CORE 2) COMPLETE | EMPTY | NO |

FIG.24

| OS | MODE | MODE USE | HANDLER POLICY | SECURITY VALIDITY | INTERRUPT PROCESSING | CONTEXT SAVE AREA | PREVIOUS SAVE |
|---|---|---|---|---|---|---|---|
| FIRST OS | NON-BANKED | -- | -- | VALID | -- | R0=A, R1=B.... | -- |
| | SVC MODE | YES | INTERRUPTED | | -- | R13=X, R14=Y, StatusRegister=Y | YES |
| | USR MODE | NO | INTERRUPTED | | -- | EMPTY | NO |
| | IRQ MODE | YES | DESTRUCTION DISABLED | | NO | EMPTY | NO |
| | FIQ MODE | YES | DESTRUCTION ENABLED | | YES | R13=X, R14=Y, StatusRegister=Y | YES |
| SECOND OS | NON-BANKED | -- | -- | INVALID | -- | R0=0, R1=0.... | -- |
| | SVC MODE | YES | INTERRUPTED | | -- | R13=0, R14=0, StatusRegister=0 | NO |
| | USR MODE | YES | INTERRUPTED | | -- | EMPTY | NO |
| | IRQ MODE | YES | DESTRUCTION ENABLED | | -- | EMPTY | NO |
| | FIQ MODE | NO | -- | | -- | EMPTY | NO |

INFORMATION PROCESSING APPARATUS, INFORMATION PROCESSING METHOD, AND COMPUTER PROGRAM PRODUCT

CROSS-REFERENCE TO RELATED APPLICATION

This application is based upon and claims the benefit of priority from Japanese Patent Application No. 2013-127647, filed on Jun. 18, 2013; the entire contents of which are incorporated herein by reference.

FIELD

Embodiments described herein relate generally to an information processing apparatus, an information processing method, and a computer program product.

BACKGROUND

In recent years, virtualization technology for executing a plurality of operating systems (hereinafter "OS") on a single calculator is being widely used. Normally, with a single calculator, it is not possible to execute more OSs than the number of cores of a processor. To execute more OSs than the number of cores, the processor has to be operated while switching the OSs in a time division manner, and a program called a monitor is used as software for switching the OS.

At the time of switching between the OSs, the monitor mentioned above saves the register that is used by the OS which is the switching source in a storage device such as a main memory, and restores the register to be used by the OS which is the switching destination from the main memory or the like. In the OS switching, in many cases, the saving/restoration process of a register by the monitor is the factor that sets a limit on the speed of OS switching, and this tendency is strong when the number of registers is great, such as in the case of a processor of ARM (registered trademark), for example.

BRIEF DESCRIPTION OF THE DRAWINGS

FIG. 2A is a block diagram illustrating a functional configuration of software of the first embodiment;

FIG. 5 is a diagram illustrating table data to be stored in a save memory of the first embodiment;

FIG. 7 is a diagram illustrating an example of table data to be stored in the save memory of the first embodiment;

FIG. 8B is a block diagram illustrating a functional configuration of software of an example modification of the second embodiment;

FIG. 9 is a diagram illustrating an example of table data to be stored in a save memory of the second embodiment;

FIG. 10 is a flow chart illustrating a process at the time of setting handler policy information of the second embodiment;

FIG. 13 is a diagram illustrating an example of table data to be stored in a save memory of the third embodiment;

FIG. 18 is a diagram illustrating an example of table data of the example modification of the third embodiment;

FIG. 21 is a diagram illustrating an example of table data to be stored in a save memory of the example modification of the third embodiment;

FIG. 24 is a diagram illustrating an example of table data to be stored in a save memory of the fourth embodiment;

DETAILED DESCRIPTION

According to an embodiment, a plurality of operating systems are capable of operating in a plurality of modes in an information processing apparatus. A register which is used by each operating system includes a banked register whose area is allocated to each mode and a non-banked register shared by the modes. The apparatus includes an instruction detector, a switcher, a save information manager, a banked register determiner, a saving register determiner, and a register saver/restorer. The instruction detector is configured to issue a first request for switching the operating systems when detecting a switching instruction regarding the operating systems. The switcher is configured to issue a second request for saving and restoring a register when the switching instruction is detected. The second request specifies the operating system that is a switching source and the operating system that is a switching destination that are included in the first request. The save information manager is configured to hold information about the mode in which the operating system is capable of operating, and information about the register that is saved at a time of switching, among the registers used by the operating system. The banked register determiner is configured to hold register information indicating which of the banked register and the non-banked register the register is, receive an acquisition instruction for the non-banked register or the banked register and the information about the mode, and return a list of the non-banked registers or a list of the banked registers used in the received mode. The saving register determiner is configured to acquire the mode in which the operating system that is the switching source is capable of operating from the save information manager, determine that saving of the banked register for the mode is necessary when the operating system that is the switching source is capable of operating in the acquired mode, and when another operating system is capable of operating in the mode, acquire a list of the banked registers that need to be saved by transferring the information about the mode to the banked register determiner, and acquire a list of the non-banked registers from the banked register determiner. The register saver/restorer is configured to, in response to the second request, acquire the lists of the banked registers that need to be saved and the non-banked registers from the saving register determiner, acquire, from the save information manager, information about the register to be restored that was saved at a time of previous switching in the operating system that is the switching destination, and save and restore the register.

Hereinafter, embodiments of an information processing apparatus according to the present invention will be described in detail with reference to the drawings.

Additionally, the invention is not restricted by these embodiments.

First Embodiment

Figure 1:
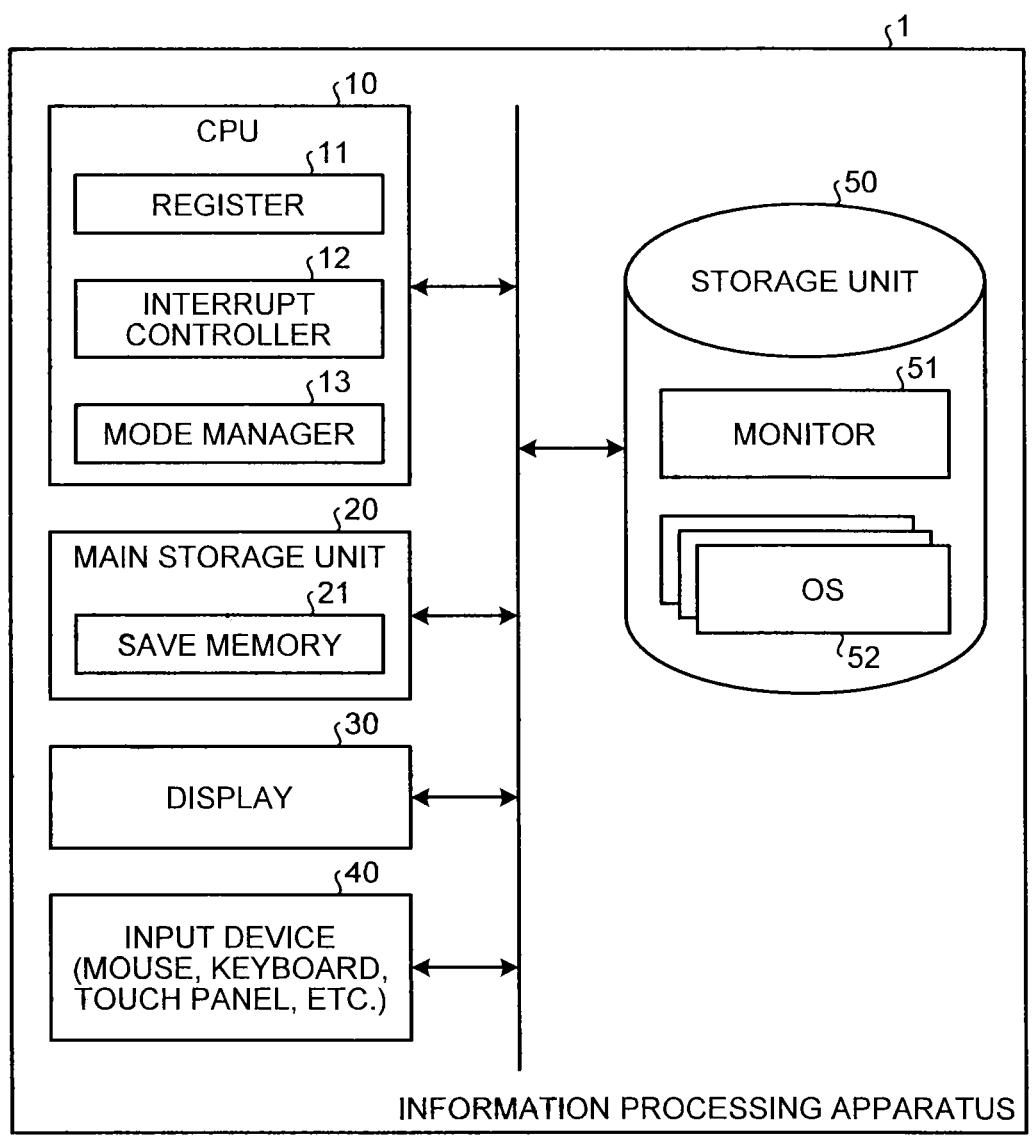
FIG. 1 is a block diagram illustrating an overall configuration of an information processing apparatus of a first embodiment.

FIG. 1 is a block diagram illustrating a hardware configuration of an information processing apparatus of a first embodiment. An information processing apparatus 1 includes a CPU 10, a main storage unit 20, a display 30, an input device 40, and a storage unit 50. The CPU 10 includes a register 11, an interrupt controller 12, a mode manager 13, and a computation unit which is not illustrated. The storage unit 50 stores a program group, such as a monitor 51 and an OS 52, to be executed by the CPU 10. Also, the main storage unit 20 is configured from a storage memory such as RAM, for example, and includes a save memory 21 for saving the value of a register.

The CPU 10 executes an instruction sequence stored in the main storage unit 20. The program of the OS 52 is loaded in the main storage unit 20, and is executed by the CPU 10. The OS 52 is a special program that performs management and the like of various devices, and that enables use from an application. Also, the CPU 10 has a function of executing a plurality of OSs 52. The monitor 51 is a program for performing management of the OS 52 such as activation and switching of the OSs 52, management of hardware resources to be used by each OS 52, and the like. The number of OSs 52 that can be executed at the same time is dependent on the number of programs that the CPU 10 is capable of executing, that is, the number of cores, but by switching and executing the OSs 52 in a time division manner, it is possible to make it virtually seem that a plurality of OSs 52 are being executed.

The monitor 51 is called up by a request from the OS 52, interrupt from the hardware, or the like, and switching of the OSs 52 is controlled by the monitor 51. Also, the CPU 10 is executed in a plurality of modes, such as a mode for executing the OS 52, a mode for executing a user program that operates on the OS 52, and a mode for processing an interrupt. These modes are controlled by the mode manager 13. For example, with respect to the processor of ARM, there are an FIQ mode and an IRQ mode for processing an interrupt, a USR mode for executing a user program, a SVC mode for executing the OS 52, a MON mode for executing the monitor, and the like. The hardware resources that can be accessed and the like are different for each mode. In the following, modes for processing an interrupt will be collectively referred to as interrupt-related mode.

Furthermore, if the register 11 is shared by the modes, the saving and restoration processes of the register become necessary every time the mode is switched, and the efficiency of mode switching is poor. For example, if an interrupt process is to be performed while a user program is being executed, it is necessary to save the register used by the user program, perform the interrupt process, and then, after the interrupt process is completed, restore the register that was used by the user program, and continue with the process. With respect to some processors, such as an ARM processor, registers are arranged on partially overlapping banks, and a different banked register is used in each mode. The registers that are arranged on overlapping banks are referred to as banked registers, and the registers that are not banked are referred to as non-banked registers. According also to the configuration in FIG. 1, the CPU 10 includes inside the register 11 banked registers, not illustrated, which are registers dedicated to respective modes, and switches the banked register at the time of mode switching. Accordingly, the processes of saving and restoring from the software do not have to be performed for the banked register at the time of mode switching, and the process at the time of mode switching is simplified and accelerated. However, when the number of banked registers is increased, the mode switching may be accelerated but the hardware scale is increased, and thus, a non-banked register, not illustrated, that is shared among modes is also provided inside the register 11 in the configuration in FIG. 1. For example, with respect to an ARM processor which is, in many cases, used for an embedded device, for example, registers called R13 and R14 are the banked registers for the SVC mode, the IRQ mode and the like, and registers called R8, R9, R10, R11, R12, R13 and R14 are the banked registers for the FIQ mode and the USR mode. That is, the R13 and R14 registers do not have to be saved or restored at the time of switching from the SVC mode to the IRQ mode.

FIG. 2A illustrates examples of hardware including the CPU 10 and the main storage unit 20, and a configuration of software that operates on the CPU 10. A monitor 200, a first OS 300, and a second OS 400 illustrated in FIG. 2A are software. Also, in the drawing, a configuration including only two OSs is illustrated, but there may be three or more OSs. In the following, the first embodiment including a monitor function for realizing high-speed OS switching will be described in detail.

First, the functions of the OSs 300 and 400 will be described. The OSs 300 and 400 each include an OS executor 301 or 401 for executing various processes of the OS, an OS switching instruction issuer 302 or 402 for requesting for OS switching, and a mode use notifier 303 or 403 for notifying the monitor 200 of the mode to be used by the OS.

When the information processing apparatus 1 is activated, each of the OSs 300 and 400 is loaded in the main storage unit 20, and execution of OS processes by the OS executors 301 and 401 present within the OSs 300 and 400, respectively, is started. The OS executors 301 and 401 have the function of executing various processes of the OS. For example, these are a task management function such as start/end of a program, a read/write function for a file, an access function for a device, and the like. Particularly, in order to execute a process that operates on another OS, the OS executors 301 and 401 have a function of calling up the OS switching instruction issuers 302 and 402, respectively, and a function of calling up, at the time of OS activation, the mode use notifiers 303 and 403, respectively.

The mode use notifiers 303 and 403 are called up by the OS executors 301 and 401, respectively, and have a function of notifying a saving register determiner 205 of the mode that their OSs use. The mode use notifiers 303 and 403 perform notification of the modes at the time of OS activation. For example, in the case of an OS where the user program is not executed and an interrupt is not handled, the saving register determiner 205 is notified that only the mode for OS operation (hereinafter "SVC mode") is to be used. Thus, the saving register determiner 205 may grasp which OS uses which mode.

The OS switching instruction issuers 302 and 402 are called up by the OS executors 301 and 401, respectively, and have a function of requesting an OS instruction detector 202 of the monitor 200 for OS switching. For example, OS switching is requested in the case a process that is desired to be performed operates on another OS. Particularly, there may be included a function of specifying, to the monitor, the switching destination OS, in the case where three or more types of OSs are to operate at the same time, for example, and there is an OS that is specifically desired to be called up. It thereby becomes possible to perform an encryption process on the second OS 400, and to call up an encryption function from the program that operates on the first OS 300, for example.

Next, the function of the monitor 200 will be described. The monitor 200 includes an OS instruction detector 202, an OS switcher 201, a register saver/restorer 204, a save information manager 203, a saving register determiner 205, and a banked register determiner 206. The OS instruction detector 202 detects an OS switching instruction. The OS switcher 201 performs OS switching. The register saver/restorer 204 performs saving and restoration of a register for OS switching. The save information manager 203 manages information about a register that is saved at the time of OS switching. The saving register determiner 205 determines a minimal register that needs to be saved. The banked register determiner 206 manages banked register information. The monitor 200 determines the minimal register that needs to be saved based on the information given by the OS 300 or 400 and reduces the number of registers to be saved to thereby accelerate the OS switching process.

The OS instruction detector 202 detects an OS switching instruction issued by the OS switching instruction issuer 302 or 402, determines the switching source OS and the switching destination OS, and transfers the information to the OS switcher 201 to perform calling up. As the method of determining the switching destination OS, in the case the switching destination OS is specifically specified by the switching source OS, this information may be used, or the OSs may be switched sequentially in a round robin algorithm, or determination may be performed based on the real-time requirements of the application operating on each OS or the degree of execution priority of each OS.

The OS switcher 201 receives the OS information of the switching source and the switching destination from the OS instruction detector 202, calls up the register saver/restorer 204 while specifying the switching source OS and the switching destination OS, and instructs the same to perform saving and restoration of context. Also, the OS switcher 201 has the function of acquiring from the register 11, and storing in the context save area of each OS in FIG. 5, the return destination at the time of OS switching, and the function of performing the acquisition and setting in the register 11 and calling up the OS executors 301 and 401.

The register saver/restorer 204 is called up by the OS switcher 201, saves the register of the switching source OS, and restores the register of the switching destination OS. The register saver/restorer 204 lists the modes that the CPU 10 includes, transfers switching source OS information, switching destination OS information and mode information to the saving register determiner 205 and calls up the saving register determiner 205, and acquires information about the register that needs to be saved. Because the register that needs to be saved is determined for all the modes of the processor, in the case the processor includes two modes, the SVC mode and the USR mode, for example, the saving register determiner 205 is called up twice. As the switching source OS information and the switching destination OS information, the identifiers of the first OS 300 and the second OS 400, and the like are used. The mode information is information specifying the mode in which the switching destination OS is to be activated. The register saver/restorer 204 saves the value of the register 11 that needs to be saved in the save memory 21 based on the acquired information.

A saving register management table as illustrated in FIG. 5 is stored in the save memory 21, and for example, in the case the register in the SVC mode has to be saved at the time of switching from the first OS 300 to the second OS 400, the register saver/restorer 204 saves a banked register in the context save area for the SVC mode of the first OS 300. The context save area of the save memory 21 after saving is as illustrated in FIG. 5. Also, the register saver/restorer 204 transfers the information about the switching source OS and the information about the register which has been saved to the save information manager 203 and requests the save information manager 203 to store the pieces of information.

Also, the register saver/restorer 204 transfers the switching destination OS information to the save information manager 203, acquires the information about the register which was saved at the time of previous switching from the switching destination OS to another OS, acquires the value of the register which was saved from the table in FIG. 5 of the save memory 21, and sets the value in the register 11. For example, in the case of switching to the first OS 300 in the state in FIG. 7, the register saver/restorer 204 sets X for the R13 register in the SVC mode, Y for the R14 register, and Y for the Status-Register. Additionally, saving and restoration are always performed for a non-banked register.

The save information manager 203 manages tables as illustrated in FIGS. 5 and 7 indicating the relationships of an OS, each mode and presence/absence of previous save. In the case setting of save information is requested by the register saver/restorer 204, the save information manager 203 updates the table based on the switching source OS information and the saving register information which have been transferred. For example, in the case the register in the SVC mode is saved in the case where the switching source OS is the first OS 300, the save information manager 203 changes the previous save section for the SVC mode of the first OS 300 from "no" to "yes" as illustrated in FIG. 5.

On the other hand, in the case there is an acquisition request, from the register saver/restorer 204, for the information about a previously saved register with the switching destination OS being specified, the save information manager 203 refers to the section of the switching destination OS, and returns information about a mode for which "yes" is indicated in the section regarding the previous save, that is, regarding the previously saved register. For example, in the state illustrated in FIG. 5, in the case the second OS 400 is specified as the switching destination OS, the save information manager 203 returns information indicating that there is no register that needs to be restored, and in the case the first OS 300 is specified, the save information manager 203 returns information indicating that the SVC mode register has to be restored. In the present configuration, the save information manager 203 is necessary because the register to be saved changes according to the mode use status of the switching source OS and the mode use status of another OS.

The saving register determiner 205 receives the switching source OS, the switching destination OS and the mode information from the register saver/restorer 204, and determines the register to be saved among the registers for the mode. The saving register determiner 205 transfers the mode information to the banked register determiner 206, and receives a list of banked registers for the mode. The saving register determiner 205 determines whether or not the switching source OS uses the mode of the banked register, based on the table as illustrated in FIG. 5 indicating which OS uses which mode. In the case the switching source OS does not use the mode, it is determined that saving is not necessary. On the other hand, in the case the switching source OS uses the mode, the saving register determiner 205 determines whether another OS uses the mode, and in the case of use, it is determined that saving is necessary, and in the case of non-use, it is determined that saving is not necessary. For example, in the example in FIG. 5, in the case of switching from the first OS 300 to the second OS 400, it is determined that the SVC mode register has to be saved because the SVC mode is also used by the second OS 400, the IRQ mode register does not have to be saved because the IRQ mode is used by the first OS 300 but not by the second OS 400, the USR mode register does not have to be saved because the USR mode is not used by the first OS 300, and the FIQ register does not have to be saved because the FIQ mode is not used by the first OS 300 or the second OS 400.

That is, it is determined that only the SVC mode register has to be saved. Furthermore, as a result, the saving register determiner 205 returns, to the register saver/restorer 204 of the call-up source, in the case saving is necessary, a list of the banked register for the mode, and in the case it is determined that saving is not necessary, information indicating that there is no register that needs to be saved. With the minimal register that needs to be saved being determined by the saving register determiner 205 based on the mode use status, the register saving/restoration time may be reduced and the OS switching may be accelerated. Furthermore, the saving register determiner 205 receives information about the mode that is used by each OS from the mode use notifier, and updates the mode use section.

Figures 3, 4:
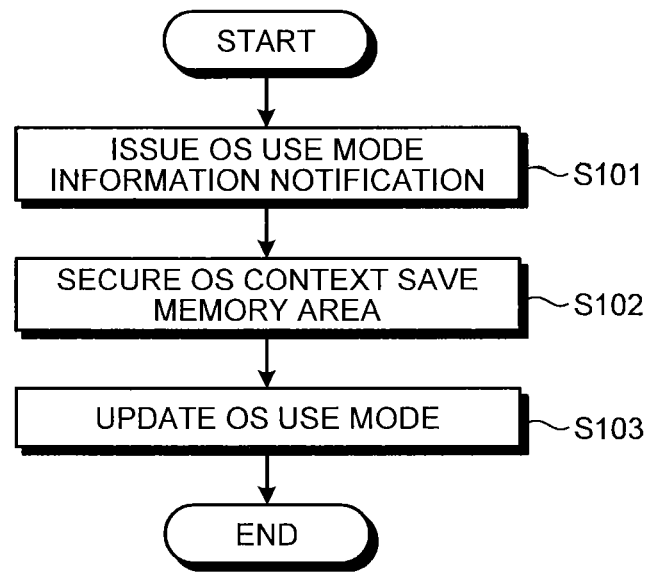
FIG. 3 is a flow chart illustrating a processing flow at the time of activation of the first embodiment.
FIG. 4 is a diagram illustrating table data managed by a banked register determiner of the first embodiment.

The banked register determiner 206 returns lists of banked registers and non-banked registers to the saving register determiner 205. The banked register determiner 206 manages a table as illustrated in FIG. 4, and returns the contents of the table. As illustrated in FIG. 4, for example, R0 is a non-banked register. Also, the R13 register for the SVC mode and the R8 register for the USR mode are banked registers. A non-banked register is used in every mode and has to be saved at the time of OS switching, and thus, banked register determination is performed by the banked register determiner 206. To determine the contents to be returned to the call-up source OS, the banked register determiner 206 receives, at the time of call-up, a non-banked register acquisition instruction or a banked register acquisition instruction having the mode information as an argument. For example, in the case acquisition of a non-banked register is instructed by the call-up source OS, the banked register determiner 206 returns R0 to R12, and in the case acquisition of a list of banked registers for the SVC mode is requested, the banked register determiner 206 returns R13, R14 and StatusRegister.

The register 11 includes a non-banked register and a banked register for each mode, and performs register value setting and register value acquisition. Also, the save memory 21 includes an area for storing the table as illustrated in FIG. 5, and has a function of performing acquisition and setting of a value with respect to the table.

Figure 2B:
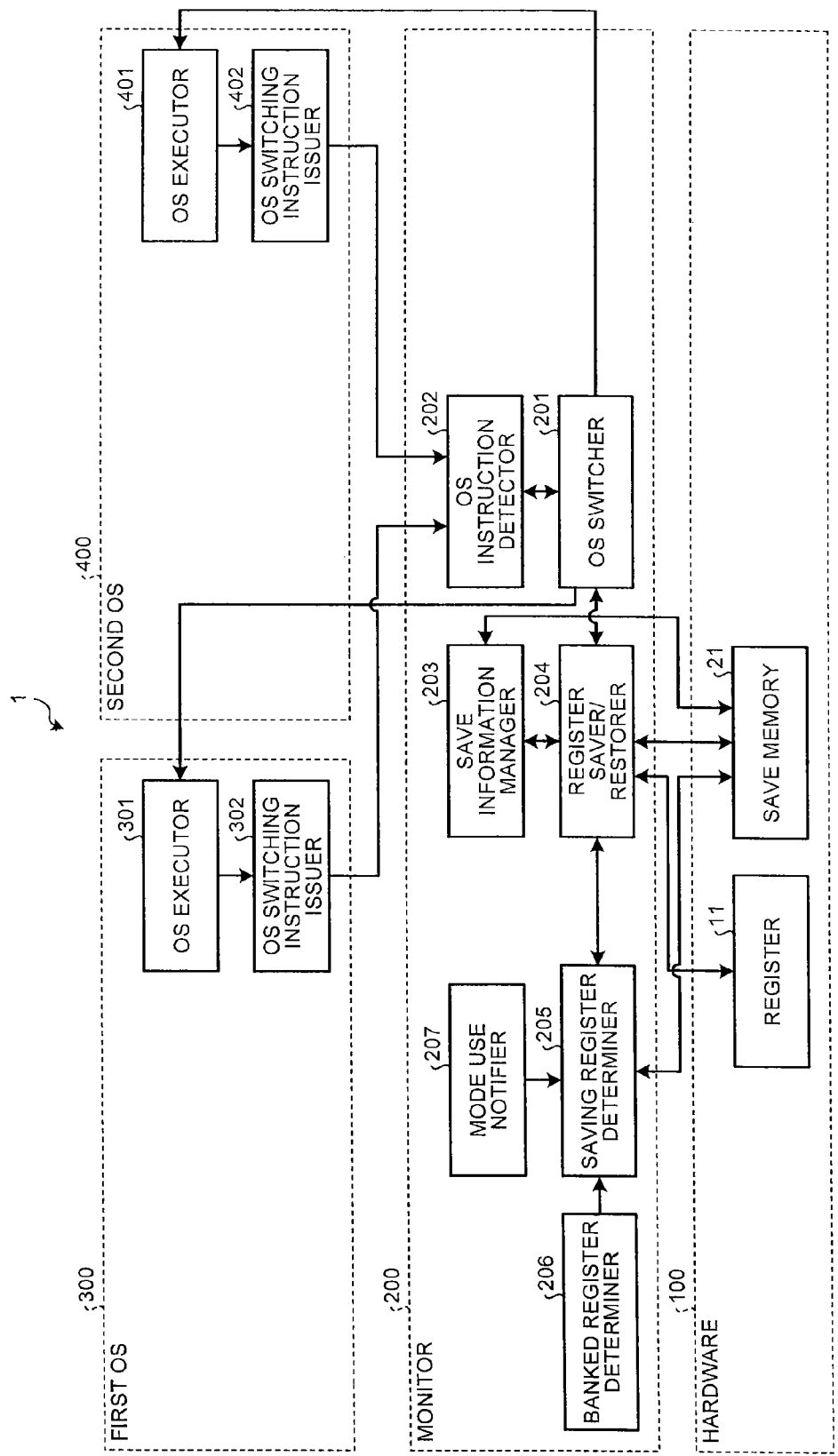
FIG. 2B is a block diagram illustrating a functional configuration of software of an example modification of the first embodiment.

Additionally, in the configuration in FIG. 2A, the mode use notifiers 303 and 304 are present in the OSs 300 and 400, respectively, but change to a configuration where a mode use notifier 207 is provided to the monitor 200, as illustrated in FIG. 2B, is also possible. In the case the OS that is to operate is known in advance, the mode to be used by each OS is notified to the saving register determiner 205 at the time of activation of the monitor 200 by providing the mode use notifier 207 to the monitor 200. It thereby becomes unnecessary to provide the mode use notifier to the OSs 300 and 400, and the configuration of existing OSs 300 and 400 may be utilized to the full.

Next, the procedure, illustrated by the flow chart in FIG. 3, at the time of activation of the OS that is stored in a storage will be described. Additionally, the monitor 200 is activated before the OSs 300 and 400 are activated. First, the mode use notifiers 303 and 403 of the OSs 300 and 400 each notify the saving register determiner 205 of the monitor 200 of which mode is to be used by the OS, at the time of activation (step S101). Or, in the case the mode use notifier 207 is included in the monitor 200, as with the configuration in FIG. 2B, the saving register determiner 205 is notified of the mode use information of each OS at the time of activation of the monitor 200.

Then, the saving register determiner 205 allocates an OS context save memory area in the save memory 21 (step S102). For example, in FIG. 5, sections for the first OS 300 and the second OS 400 are already present, but in the case there is a notification from another third OS, the saving register determiner 205 allocates an area for writing data of the third OS, and performs initialization. At this time, the previous save section is no, and the context save area is empty.

Furthermore, the saving register determiner 205 updates the mode use section of the call-up source OS in FIG. 5 (step S103). For example, in the case of FIG. 5, the SVC mode and the IRQ mode are to be used by the first OS 300, and the USR mode and the FIQ mode are not to be used. The notification process at the time of OS activation is thus ended.

Figure 6:
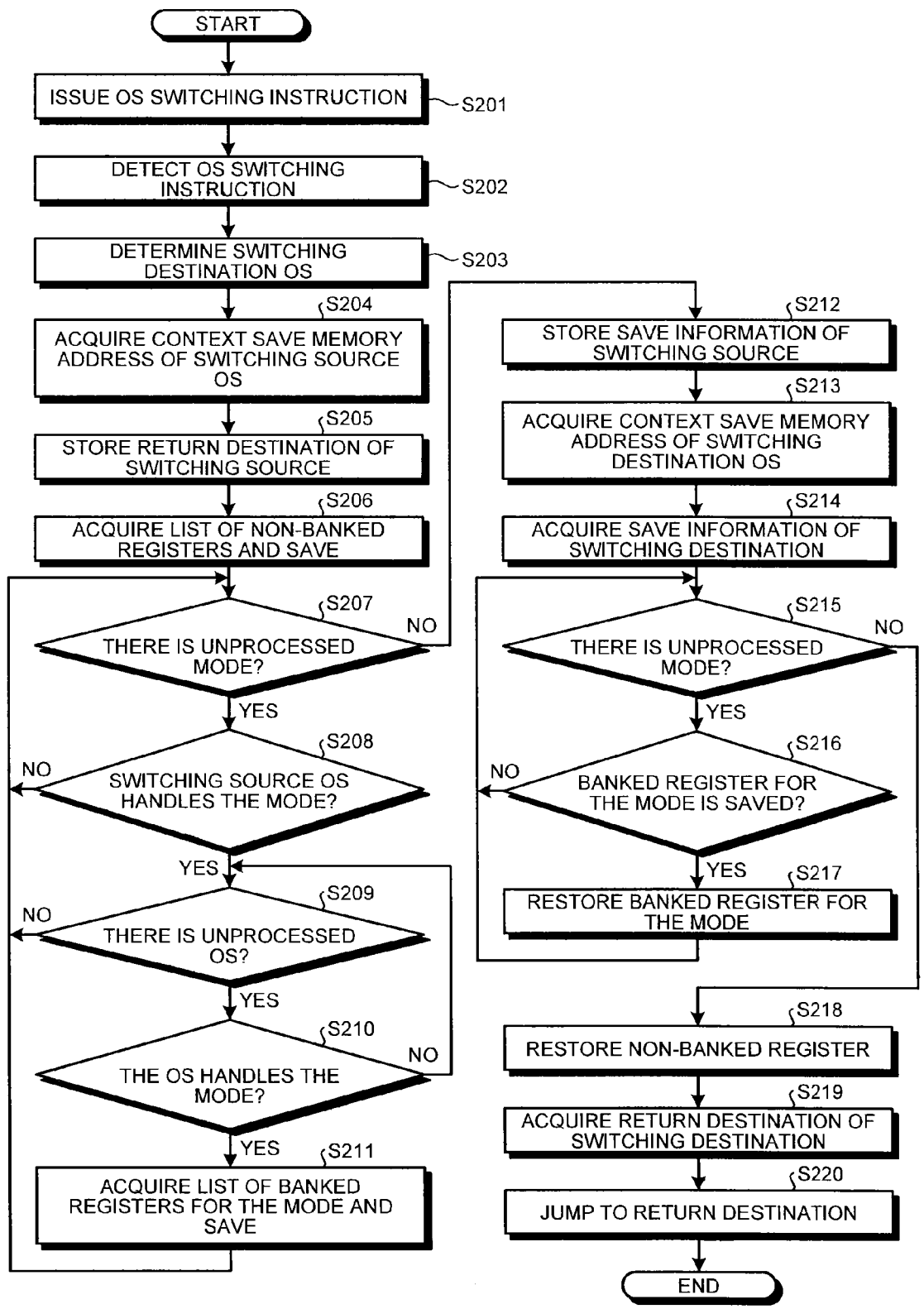
FIG. 6 is a flow chart illustrating a processing flow at the time of switching of the first embodiment.

Next, a procedure at the time of OS switching illustrated by the flow chart in FIG. 6 will be described. First, at the time of OS switching, the OS switching instruction issuer 302 or 402 issues an OS switching instruction (step S201). Then, the OS instruction detector 202 detects the OS switching instruction (step S202). Furthermore, the OS instruction detector 202 determines the switching destination OS (Step S203). As the algorithm, if there is specific specification by the switching source OS, that OS may be made the switching destination, or a known scheduling method such as a round robin, priority-based scheduling or EDF (Earliest Deadline First) may be used in the determination.

Furthermore, the OS instruction detector 202 calls up the OS switcher 201, and the OS switcher 201 acquires the context save memory for the switching source OS (step S204), and stores the return destination address for the switching source OS in the context save memory which has been acquired (step S205). Moreover, the OS switcher 201 calls up the register saver/restorer 204, and the register saver/restorer 204 acquires a list of non-banked registers from the banked register determiner 206, and saves the non-banked registers in the context save memory for the switching source OS (step S206).

Moreover, the saving register determiner 205 and the register saver/restorer 204 perform saving of the banked register of the switching source OS. In the following, details of the process of saving a banked register will be given. First, the register saver/restorer 204 determines whether there is an unprocessed mode in order to list the modes of the CPU 10 (step S207). An unprocessed mode is a mode among the SVC mode and the IRQ mode where the process has not been completed, and it is determined based on the process status of each mode held by the register saver/restorer 204. In the case it is determined that there is no unprocessed mode (step S207: No), the process proceeds to step S212 because all the necessary registers have been saved.

On the other hand, in the case it is determined that there is an unprocessed mode (step S207: Yes), the register saver/restorer 204 calls up the saving register determiner 205, and the saving register determiner 205 determines whether the switching source OS handles the mode or not (step S208). In the case it is determined that the mode is not handled (step S208: No), there is no need to perform register saving, and the process returns to step S207 to perform processing for the next mode. In the case it is determined that the mode is handled (step S208: Yes), the saving register determiner 205 then determines whether another OS handles the mode or not. This is because, in the case another OS handles the mode, there is a possibility that the banked register of the mode will be destroyed, and the banked register for the mode has to be saved. First, the saving register determiner 205 lists the OSs other than its OS, and performs the following process for each OS.

First, the saving register determiner 205 determines whether there is an unprocessed OS or not (step S209). In the case it is determined that there is no unprocessed OS (step S209: No), it is determined that all the OSs have been processed, and the process returns to step S207. In the case it is determined that there is an unprocessed OS (step S209: Yes), the saving register determiner 205 refers to the saving register management table illustrated in FIG. 5, and determines whether the OS handles the mode or not (step S210). In the case it is determined that the mode is not handled (step S210: No), the process returns to step S209, and the process is performed for the next OS. In the case it is determined that the OS handles the mode (step S210: Yes), the saving register determiner 205 determines that saving of the register is necessary, acquires the list of the banked registers for the mode, and saves the contents of the registers in the context save area of the switching source OS (step S211), and returns to step S207 to perform processing for the next mode. When all the modes have been processed, the register saver/restorer 204 transfers the information about the register which has been saved and the switching source OS information to the save information manager 203, and the save information manager 203 stores the save information of the switching source OS (step S212). That is, the section of the previous save of each mode of the switching source OS in FIG. 5 is updated. For example, in the case only the non-banked register and the banked register for the SVC mode are saved, as in FIG. 7, at the time of switching the OS from the first OS 300 to the second OS 400, "yes" is set in the section of the previous save of the SVC mode of the first OS 300, and "no" is set in the sections of the USR mode, the IRQ mode and the FIQ mode of the first OS 300.

Then, the register saver/restorer 204 and the save information manager 203 perform the process of restoring the register value which was saved when the switching destination OS was previously switched to another OS. First, the register saver/restorer 204 acquires the address of the memory where the context of the switching destination OS is stored (step S213). Also, to check whether the previous save was performed for all the modes, the register saver/restorer 204 calls up the save information manager 203 by transferring the address of the context save memory which has been acquired, and acquires switching destination save information from the address of the context save memory (step S214). Then, the save information manager 203 checks whether there is an unprocessed mode acquired (step S215). In the case it is determined that there is no unprocessed mode (step S215: No), it is determined that all the modes have been processed, and the process proceeds to step S218.

In the case it is determined that there is an unprocessed mode (step S215: Yes), the save information manager 203 extracts one mode from the unprocessed mode(s), and checks whether the banked register for the mode was previously saved, based on the saving register management table in FIG. 5 (step S216). In the case it is not saved (step S216: No), the process proceeds to step S215 to perform processing for the next mode.

On the other hand, in the case the selected register was previously saved (step S216: Yes), the register saver/restorer 204 extracts the value of the banked register for the mode from the context save area of the switching destination, and restores the register (step S217). Then, the process returns to step S215. When restoration of the banked register is ended, the register saver/restorer 204 restores the non-banked register (step S218), and furthermore, the OS switcher 201 acquires the return destination of the switching destination OS which was stored at the time of switching from the previous switching destination OS to another OS (step S219), jumps to the return destination, and ends the OS switching (step S220).

Second Embodiment

In the process described above, the banked register to be saved is determined only based on the mode information of each OS. However, if it can be guaranteed that OS switching will not take place during processing (handling) of a specific mode, there are cases where the register for the mode is allowed to be destroyed. However, even if it is guaranteed that OS switching will not take place during processing, there are cases where the register cannot be destroyed, such as a case where a stack point is not set every time of entering the mode. Whether destruction is allowed or not is dependent on the design of the OS. That is, in the case it can be guaranteed that OS switching will not take place during processing, and destruction of the register is allowed, the register does not have to be saved. Furthermore, by the OS conveying to the monitor the information (handler policy information) about whether it can be guaranteed that OS switching will not take place and whether destruction of the register is allowed, the monitor is enabled to determine, based on the information, whether register saving at the time of OS switching is necessary or not. The registers that need to be saved at the time of OS switching may possibly be even more reduced compared to the case of determining the banked registers to be saved based only on the mode information of each OS.

Figure 8A:
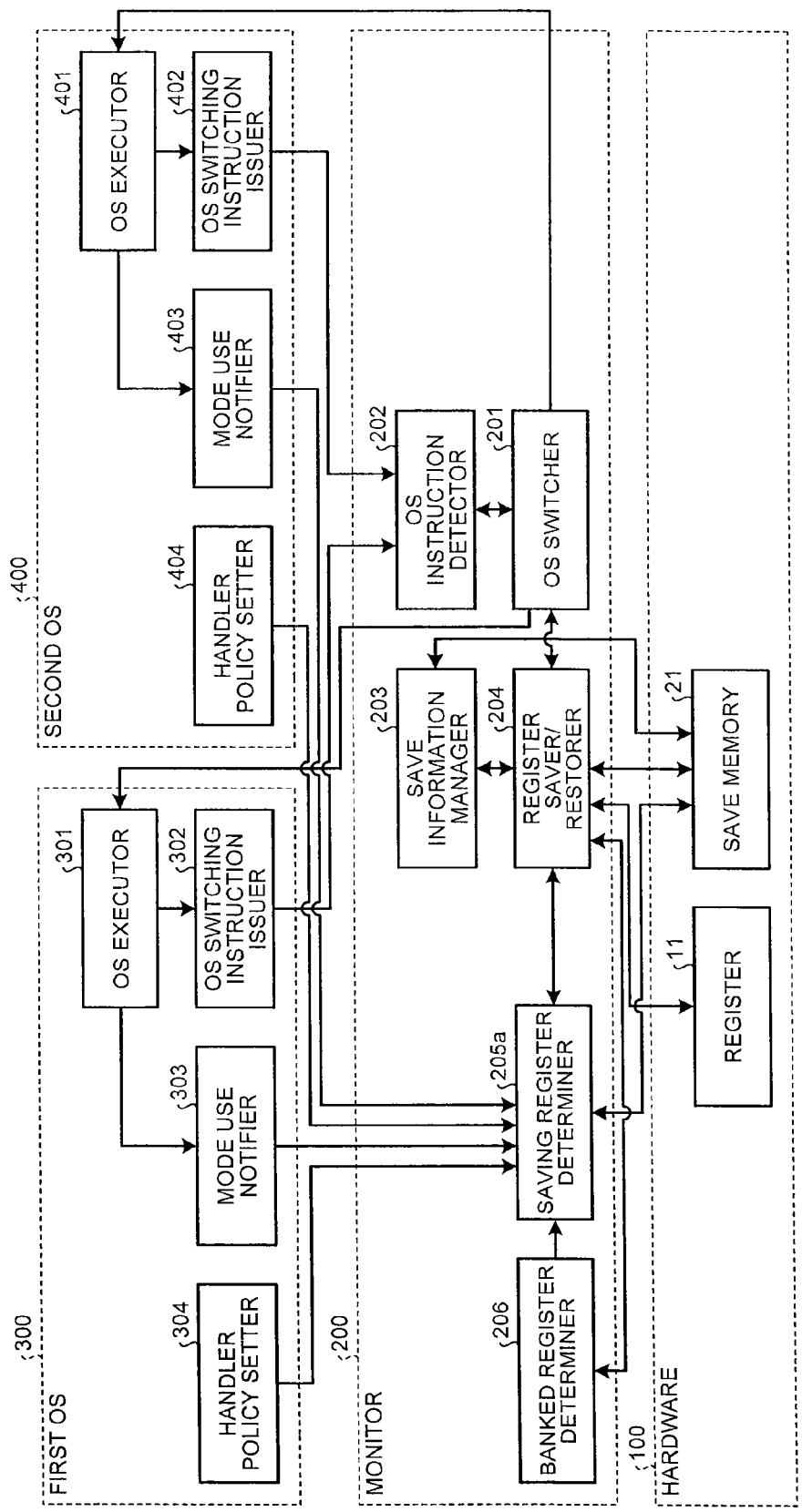
FIG. 8A is a block diagram illustrating a functional configuration of software of a second embodiment.

FIG. 8A is a configuration for realizing acceleration of OS switching by determining the registers that need to be saved based not only on the mode use information but also on the handler policy information and by saving only the minimal registers. FIG. 8A differs from FIG. 2A in that handler policy setters 304 and 404 are included, and also in the internal processing of a saving register determiner 205a. Each process will be described below.

At the time of OS activation, the handler policy setters 304 and 404 each set in the saving register determiner 205a, for each mode of the OS, information about whether interruption of the process will take place during the processing in the mode or not. Additionally, even in the case there will be no interruption of the process, if destruction of the register is not allowed, process "interruptible" is set.

The saving register determiner 205a has a function of performing setting of a handler policy for each mode of each OS according to a request from the handler policy setter 304 or 404, and also, a function of determining whether the register for each mode needs to be saved or not. In the case there is a setting request from the handler policy setter 304 or 404, a handler policy section in FIG. 9 of a setting source OS of a handler policy is updated. On the other hand, in the case of determining whether the register for each mode needs to be saved or not, the method of determining whether the banked register for each mode needs to be saved or not is different from the case in FIG. 2A. The saving register determiner 205a determines that the banked register for the mode needs to be saved, only when a switching source OS handles the mode and "interruptible" is set for the mode of the switching source OS, and there is another OS that handles the mode.

Additionally, in the configuration in FIG. 8A, the mode use notifier 303 and the handler policy setters 304 and 404 are included in the OSs 300 and 400, but change to a configuration where the mode use notifier 207 and a handler policy setter 214 are provided to the monitor 200, as in FIG. 8B, is also possible. In the case which OS is to operate is known in advance, the mode to be used by each OS and the handler policy information are conveyed to the saving register determiner 205a at the time of activation of the information processing apparatus 1 by providing the mode use notifier 207 and the handler policy setter 214 to the monitor 200. It thereby becomes unnecessary to provide the mode use notifier and the handler policy setter to the OSs 300 and 400, and the configuration of an existing OS may be utilized to the full.

Next, a procedure for policy setting as illustrated by the flow chart in FIG. 10 will be described. The handler policy setters 304 and 404 notify the saving register determiner 205a of the handler policy of each mode (step S302). Or, in the case of providing the handler policy setter 214 to the monitor 200 as in FIG. 8B, the handler policy setter 214 notifies the saving register determiner 205a of the handler policy of each OS at the time of activation of the monitor 200. The saving register determiner 205a performs setting of the handler policy section of each OS for each mode (step S303), and ends the setting of the handler policy.

Figure 11:
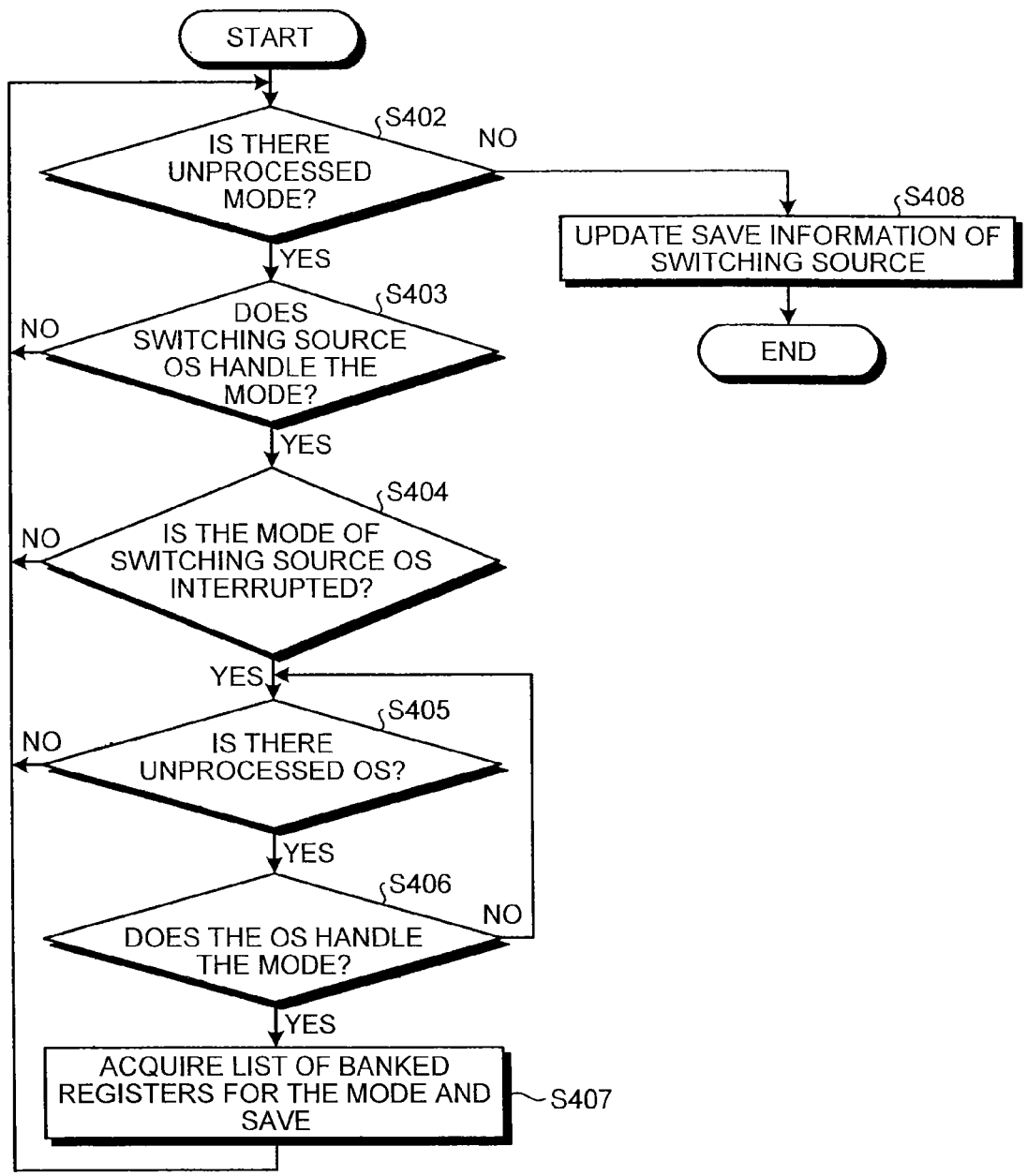
FIG. 11 is a flow chart illustrating a context save process of the second embodiment.

Next, among the processes at the time of OS switching, the flow of the context save process will be described with reference to FIG. 11. Additionally, FIG. 11 extracts, and illustrates, the processes corresponding to steps S207 to S212 in FIG. 6, and other processes are the same as those in FIG. 6. First, to determine whether banked registers need to be saved for all the modes, the register saver/restorer 204 lists the modes, and determines whether there is an unprocessed mode or not (step S402). In the case it is determined that there is no unprocessed mode (step S402: No), the register saver/restorer 204 calls up the save information manager 203, updates the section of the previous save information in FIG. 9 with respect to the mode information of the saved banked register of the switching source OS (step S408), and ends the context saving.

On the other hand, in the case there is an unprocessed mode (step S402: Yes), the register saver/restorer 204 calls up the saving register determiner 205a, and the saving register determiner 205a determines whether the mode is handled by the switching source OS or not (step S403). In the case it is not handled (step S403: No), the saving register determiner 205a determines that the register does not have to be saved, and returns to step S402. In the case it is determined that the mode is handled (step S403: Yes), the saving register determiner 205a checks whether the mode is interrupted or not by referring to the saving register management table in FIG. 9 (step S404).

In the case it is determined that there is no interruption (step S404: No), the saving register determiner 205a determines that the register does not have to be saved, and returns to step S402. On the other hand, in the case it is determined that there is an interruption (step S404: Yes), the saving register determiner 205a proceeds to the process of determining whether the mode is handled by another OS. Specifically, the saving register determiner 205a lists all the OSs, and determines whether there is an unprocessed OS (step S405). In the case it is determined that there is no unprocessed OS (step S405: No), the saving register determiner 205a proceeds to step S402 to perform the process for the next mode. In the case it is determined that there is an unprocessed OS (step S405: Yes), the saving register determiner 205a extracts the use information for the mode of the OS, and determines whether the mode is handled or not (step S406). In the case it is determined that the OS does not handle the mode (step S406: No), the process returns to step S405. In the case it is determined that the mode is handled (step S406: Yes), the saving register determiner 205a determines that the banked register for the mode has to be saved, acquires a list of banked registers and saves the values (step S407), and returns to step S402.

According to the information processing apparatus 1 of the present embodiment, the registers to be saved may be reduced and the process of OS switching may be accelerated by determining the registers that need to be saved at the time of OS switching by using the handler policy information and the mode use information of each OS. Also, according to the present embodiment, implementation is easy because no special compiler or the like is necessary to realize the configuration. Additionally, in the present embodiment, whether or not the register has to be saved is determined every time of OS switching, but since the banked registers that need to be saved do not change if the setting related to mode use is not changed, and thus, it is also possible to perform determination regarding whether or not saving of the banked register is necessary once in advance, and to determine, based on the result, saving or non-saving of the banked register.

Third Embodiment

In the embodiment described above, the register to be saved is determined based on the information set by the OSs 300 and 400, such as the mode use information. This implies that the OSs 300 and 400 have to be provided with an information notification function with respect to the monitor 200. In contrast, if the monitor is capable of automatically determining, at least partially, use/non-use of a mode without depending solely on the information notified by the OS, the information notification function of the OSs 300 and 400 may be removed or simplified. This eliminates the need to provide a special structure for acceleration to the OSs 300 and 400, or to simplify the structure, and the design of existing OSs 300 and 400 may be utilized to the full. In the following, the details of the present embodiment will be described with reference to the drawings.

Figure 12:
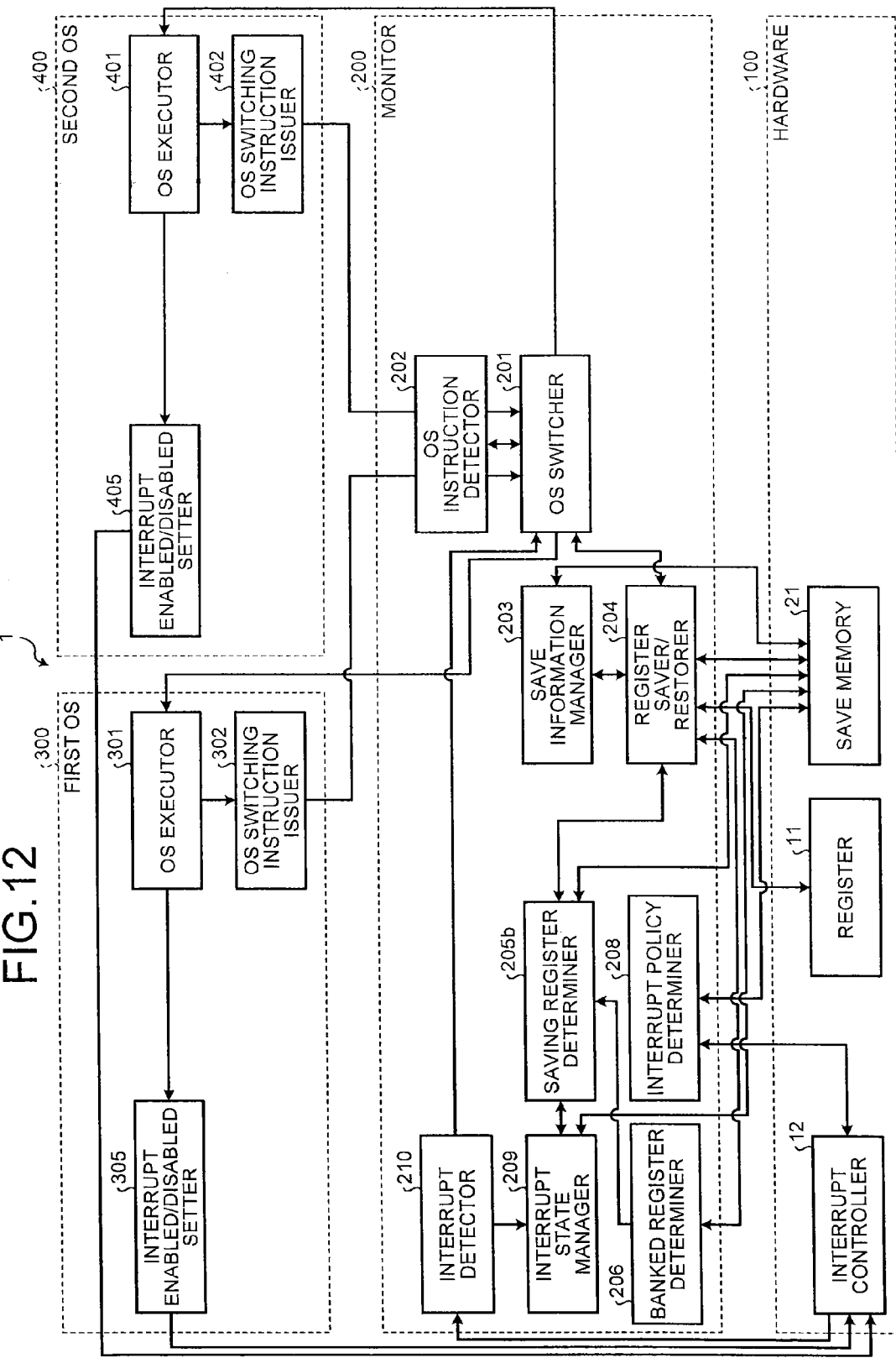
FIG. 12 is a block diagram illustrating a functional configuration of software of a third embodiment.

FIG. 12 illustrates examples of hardware including a CPU 10 and a main storage unit 20 according to a third embodiment, and a software configuration that is operated by the CPU 10. FIG. 12 differs from FIG. 8A in that OSs 300 and 400 include an interrupt enabled/disabled setters 305 and 405, respectively, that a monitor 200 includes an interrupt detector 210, an interrupt state manager 209, and an interrupt policy determiner 208, that hardware 100 includes an interrupt controller 12, and that there is no mode notifier or handler policy setter. Moreover, the internal processing of a saving register determiner 205b is also different. Additionally, in the configuration in FIG. 12, it is assumed that interrupt input enabled/disabled information does not change from OS activation to the end. Furthermore, the structure of the table, illustrated in FIG. 13, stored in a save memory 21 is different from that in FIG. 5. The saving register management table illustrated in FIG. 13 does not include the mode use column in FIG. 5, and includes an interrupt state column. The initial values in the interrupt state column are "--". The points mentioned above will be described below.

The interrupt enabled/disabled setters 305 and 405 each set, with respect to the interrupt controller 12 of the hardware 100, whether its OS accepts an interrupt or not. In the case disabled is set, an interrupt is not input to the OS. On the other hand, in the case enabled is set, an interrupt handler provided to each of OS executors 301 and 401 is called up at the time of occurrence of an interrupt. That is, in the case of a mode for processing an interrupt, in many cases, whether an interrupt is accepted and whether operation in the mode is possible are the same thing, and thus, whether the mode is used or not may be determined based on the setting of the interrupt enabled/disabled setters 305 and 405.

For example, in the case of a processor where an IRQ interrupt is processed in the IRQ mode, if an OS is set such that an IRQ interrupt is not accepted, the OS will not operate in the IRQ mode. That is, the IRQ register does not have to be saved at the time of switching from the OS to another OS.

The interrupt controller 12 sets the interrupt input enabled/disabled according to a request for setting interrupt input enabled/disabled from the OS 300 or 400. Furthermore, at the time of setting interrupt input enabled/disabled, setting source OS information and input enabled/disabled are notified to the interrupt policy determiner 208. At the time of occurrence of an interrupt, occurrence of the interrupt is notified to the interrupt detector 210 of the monitor 200 if interrupt input enabled is set, and the interrupt is ignored in the case interrupt input disabled is set.

In the case an interrupt occurs, the interrupt detector 210 is called up by the interrupt controller 12. According to the present embodiment, the interrupt detector 210 is provided inside the monitor 200, but it may alternatively be provided inside the OSs 300 and 400. The interrupt detector 210 determines the OS that is to perform an interrupt process, based on the information about the OS that is currently executed and the type of interrupt. After the determination, the interrupt detector 210 transfers the interrupt input destination OS and an interrupt mode to the interrupt state manager 209, and requests the interrupt state manager 209 to change the interrupt state to being processed.

As the method of determining the OS for which the interrupt process is to be performed, it may be determined in advance such that input is performed to a specific OS, or the type of interrupt accepted by the OS may be notified to the monitor in advance, or input may be performed to the OS that is operating at the time of occurrence of the interrupt. Moreover, the interrupt detector 210 is called up also at the time of completion of the interrupt process by the OS. At this time, after determining the information about the OS to which an interrupt was input and the type of the interrupt, the interrupt input destination OS and the interrupt mode are transferred to the interrupt state manager 209, and the interrupt state manager 209 is requested to change the interrupt state to process complete. Although depending on the design of the OS, if the interrupt process is completed, in many cases, the register for the interrupt processing mode may be destroyed, and thus, depending on the design of the OS, register saving may be omitted. Accordingly, the interrupt detector 210 is provided in order to determine whether the interrupt process is completed or an interrupt is being processed.

The interrupt state manager 209 changes the information about "interrupt state" in the table in FIG. 13 in response to a request from the interrupt detector 210. The initial values of "interrupt state" in the saving register management table in FIG. 13 are "invalid" for modes for performing an interrupt process (such as IRQ/FIQ), and "--(outside interrupt mode)" for other modes. Outside interrupt mode is a mode switching thereto cannot be detected by the interrupt detector 210. For example, with respect to the USR mode and the like, transition to the mode due to an interrupt does not take place, and thus, it is outside interrupt mode. The interrupt state manager 209 receives, from the interrupt detector 210, information about the interrupt input destination OS and the interrupt processing mode. In the case a request to change to interrupt being processed is received, the interrupt state manager 209 updates the corresponding section under "interrupt state" in the table in FIG. 13 to "processing". For example, in the case the interrupt input destination is the first OS 300, and the interrupt type is FIQ, change to "processing" takes place. On the other hand, in the case of a request to change to interrupt process complete, the corresponding section under "interrupt state" in the table in FIG. 13 is updated to "complete". For example, in the case the interrupt input destination is the first OS 300, and the interrupt type is IRQ, change to "complete" takes place. It thereby becomes possible to determine whether there is an interrupt that is being processed in each interrupt mode of each OS, based on the saving register management table, and if an interrupt is not being processed, an interrupt-related register is allowed to be destroyed depending on the handler policy information described later, and thus, the saving process may be omitted for some registers.

Also, the interrupt state manager 209 returns, in response to a request from the saving register determiner 205b, the specified OS and whether an interrupt is being processed in the interrupt mode or not. For example, in the case the second OS 400 is specified as the OS, and IRQ is specified as the interrupt mode, "complete" is returned. Also, in the case "invalid" is specified in the interrupt state section in FIG. 13, it is set that the interrupt input is not possible, and "invalid" is returned, and in the case "--" is set, it is determined that the mode does not handle an interrupt, and "-- (outside interrupt mode)" is returned. That is, the information to be returned from the interrupt state manager 209 is any one of "processing", "complete", "invalid", and "-- (outside interrupt mode)".

When interrupt enabled/disabled is set, the interrupt policy determiner 208 updates the section related to the interrupt state in the table in FIG. 13. There is provided a function of setting "complete" in the case setting source OS information and input enabled/disabled information are received from the interrupt controller 12, and enabled is set, with respect to the interrupt enabled/disabled setting, in the corresponding interrupt state section in the table in FIG. 13, and of setting "invalid" in the case disabled is set.

The saving register determiner 205b determines whether register saving is necessary for each mode or not. In determining whether register saving is necessary for each mode or not, the method of determining whether the banked register for each mode needs to be saved or not is different from the case of the first embodiment. The saving register determiner 205b determines, based on the section under the interrupt state in the table in FIG. 13, whether the mode is an interrupt-related mode or not. That is, a mode may be determined to be an interrupt-related mode if other than "--" is set in the section regarding the interrupt state. In the case of an interrupt-related mode, it is determined, based on the section of the switching source OS of "interrupt state" in the table in FIG. 13, whether the switching source OS is processing an interrupt. In the case a mode is an interrupt-related mode, and moreover, the switching source OS is processing an interrupt, the banked register for the mode needs to be saved if there is a possibility that the register is destroyed by an OS other than the switching source. In the case a mode is an interrupt-related mode, and moreover, the interrupt processing of the switching source OS is complete, it is determined that the banked register for the mode may be destroyed, and that register saving is not necessary.

On the other hand, in the case a mode is other than an interrupt-related mode, it is determined that the banked register for the mode needs to be saved. Also, with respect to whether an OS other than the switching source possibly destroys the register, in the case the mode is an interrupt-related mode, if interrupt "invalid" is set in the "interrupt state" section in the table in FIG. 13 for an OS other than the switching source, no interrupt is input and there is no possibility of the banked register for the mode being destroyed, and thus, it is determined that register saving is not necessary. In the case there is an OS for which an interrupt is enabled, that is, there is an OS other than the switching source for which the interrupt state of the mode, in FIG. 13, is "complete" or "processing", it is determined that register saving is necessary. In the case it is determined that register saving is necessary, the saving register determiner 205b acquires the list of banked registers for the mode from the banked register determiner 206, and returns the same to the call-up source.

The saving register determiner 205b determines whether an interrupt is being processed or not, based on the interrupt state section in FIG. 13 set by the interrupt detector 210, and also, determines whether another OS possibly destroys the banked register, based on interrupt acceptability information, to thereby automatically determine whether the banked register needs to be saved or not.

Figure 14:
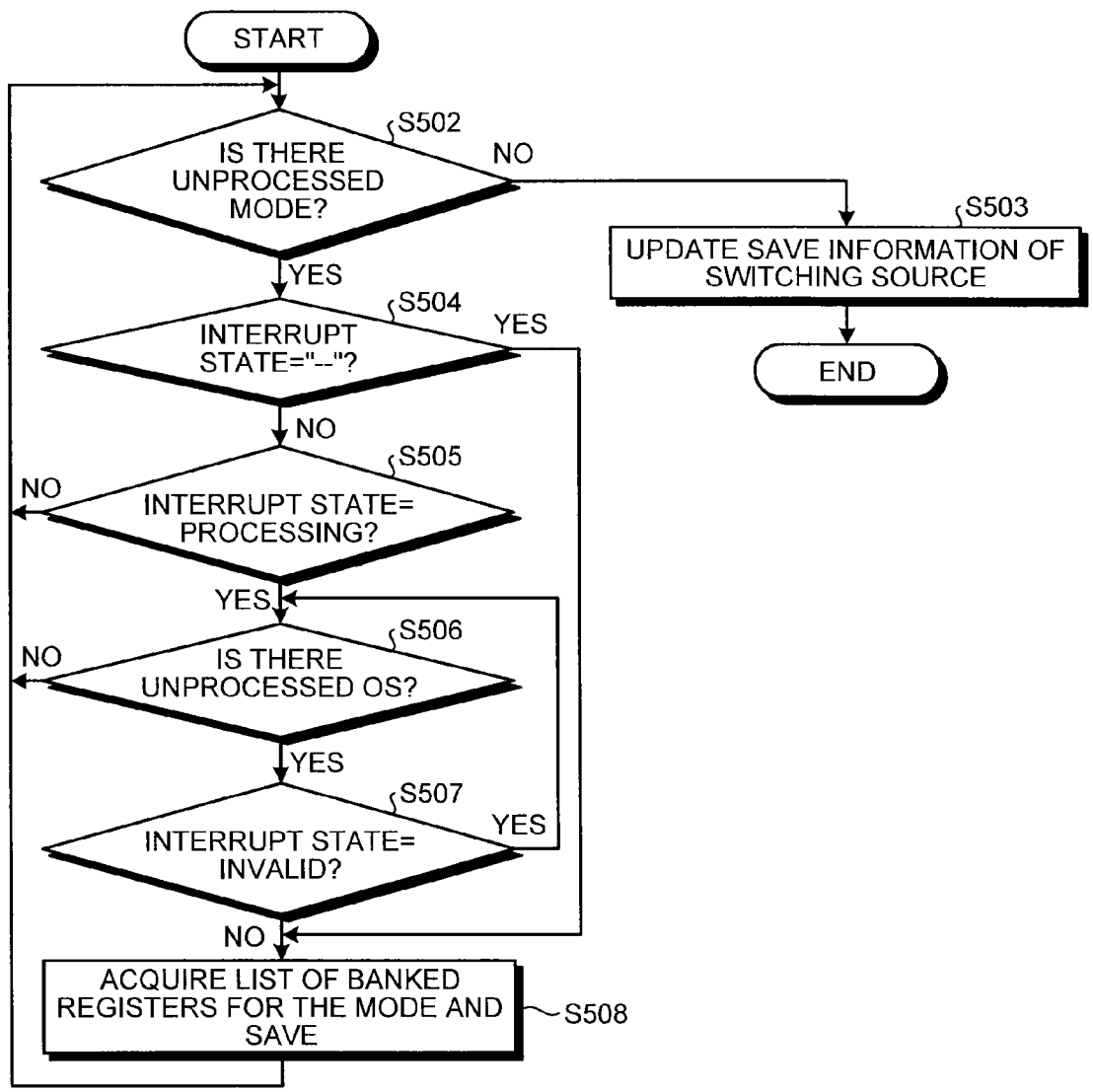
FIG. 14 is a flow chart illustrating a context save process of the third embodiment.

Next, a procedure of a context save process at the time of OS switching illustrated by the flow chart in FIG. 14 will be described. Additionally, FIG. 14 extracts, and illustrates, the processes corresponding to steps S207 to S212 in FIG. 6, and other processes are the same as those in FIG. 6.

First, when the context save process is started, the register saver/restorer 204 determines whether there is an unprocessed mode or not to determine whether the banked registers have to be saved for all the modes (step S502). In the case it is determined that there is no unprocessed mode (step S502: No), the register saver/restorer 204 requests the save information manager 203 to store information about a saved banked register, and the save information manager 203 updates the section under the previous save in the saving register management table in FIG. 13, and ends the process (step S503).

In the case it is determined that there is an unprocessed mode (step S502: Yes), the saving register determiner 205b extracts one piece of unprocessed mode information, and determines whether the mode is an interrupt-related mode or not. As the method of determination at this time, whether the interrupt state section for the mode of the switching source OS is "--" or not is determined, and the mode is determined to be an interrupt-related mode in cases other than "--" (step S504). In the case of an interrupt-related mode (step S504: No), the saving register determiner 205 determines whether the OS is currently processing an interrupt for the mode or not, by acquiring an interrupt state from the interrupt state manager 209.

That is, if the interrupt state section of the mode of the switching source OS in FIG. 13 is "processing", it is determined that an interrupt is being processed, and in other cases ("complete" or "invalid"), it is determined that an interrupt is not being processed (step S505). In the case it is determined that an interrupt is not being processed (step S505: No), it is determined that the banked register for the mode does not have to be saved, and the process returns to step S502 to perform processing for the next mode. In the case it is determined that an interrupt is being processed (step S505: Yes), if there is a possibility of another OS destroying the banked register for the mode, the banked register needs to be saved, and thus, the saving register determiner 205b determines in processes following step S506 whether another OS may destroy the register. Also, in step S504, in the case the processing mode is not an interrupt-related mode (step S504: Yes), it is determined that the banked register for the mode needs to be saved, and the process proceeds to step S508. In the processes following step S506, the saving register determiner 205b determines whether an OS other than the switching source OS possibly destroys the banked register for the mode. This is because, if there is no possibility of destruction, the banked register for the mode does not have to be saved. In the following, details will be given for the processes following step S506 for determining, for all the OSs other than the switching source OS, whether there is a possibility of the banked register for the mode being destroyed or not.

First, in order to determine, for all the OSs other than the switching source OS, whether there is a possibility of the banked register for the mode being destroyed, the saving register determiner 205b determines whether there is an unprocessed OS among the OSs that are operating (step S506). In the case it is determined that determination has been performed for all the OSs, and that there is no unprocessed OS (step S506: No), it is determined that the banked register for the mode does not need to be saved, and the process returns to step S502. In the case it is determined that there is an unprocessed OS (step S506: Yes), the saving register determiner 205b extracts one OS from the unprocessed OSs, and determines whether an interrupt is disabled, that is, whether the interrupt state section for the mode of the OS is "invalid" or not (step S507).

In the case invalid is determined (step S507: Yes), it is determined that an interrupt is set to disabled, and that there is no possibility of register destruction, and the process returns to step S506 to perform determination for the next OS. On the other hand, in the case it is determined that other than "invalid" is set in the interrupt state section (step S507: No), there is a possibility that an interrupt input is performed, and that the register is destroyed, and thus, the register saver/restorer 204 acquires the list of banked registers for the mode via the banked register determiner 206, and performs a save process with respect to the save memory 21 (step S508). Then, the process returns to step S502 to perform processing for the next mode.

Next, a procedure at the time of setting interrupt enabled/disabled illustrated by the flow chart in FIG. 15 will be described. First, when an interrupt enabled/disabled setting process is started, the interrupt enabled/disabled setters 305 and 405 transfer the type of an interrupt mode and interrupt acceptability information to the interrupt controller 12 of the hardware 100, and set whether an interrupt may be accepted or not (step S601). Next, the interrupt controller 12 calls up the interrupt policy determiner 208, transfers thereto the contents of setting transferred from the interrupt enabled/disabled setters 305 and 405, and notifies the same that an interrupt setting has been performed (step S602). The interrupt enabled/disabled setters 305 and 405 each acquire information about the OS that is currently executed, and update the interrupt state section of a corresponding OS and a corresponding mode in FIG. 13 (step S603). At this time, the interrupt enabled/disabled setters 305 and 405 each identify the interrupt enabled/disabled setting which has been transferred, and determine whether an interrupt is enabled or not (step S604). In the case setting indicating that an interrupt is enabled has been transferred (step S604: Yes), the interrupt enabled/disabled setters 305 and 405 each set the interrupt state to "complete" (step S605). On the other hand, in the case setting indicating that an interrupt is disabled has been transferred (step S604: No), the interrupt enabled/disabled setters 305 and 405 each update the interrupt state to "invalid" (step S606).

Next, a procedure at the time of occurrence of an interrupt illustrated by the flow chart in FIG. 16 will be described. At the time of occurrence of an interrupt, the interrupt controller 12 notifies the interrupt detector 210 of the type of an interrupt mode and occurrence of the interrupt (step S701). The interrupt detector 210 determines the interrupt input destination OS (step S702). The interrupt detector 210 notifies the interrupt state manager 209 of the interrupt input destination OS and the interrupt mode, and the interrupt state manager 209 changes the interrupt state section of the OS and the mode to "processing" (step S703). Furthermore, the interrupt detector 210 calls up the OS switcher 201, switches the OS to the interrupt input destination OS, and calls up interrupt handlers in the OS executors 301 and 401 (step S704). Furthermore, after the interrupt process is ended, switching to the originally operating OS is performed, and the interrupt detector 210 sets "complete" in the interrupt state section of the interrupt input destination OS and the mode (step S705), and the process at the time of occurrence of an interrupt is ended.

In the above, the OS is switched to the interrupt input destination OS and the interrupt process is started at the time of notification of an interrupt from the interrupt controller 12, but this is not restrictive, and the interrupt process may be performed with a delay by switching to the interrupt input destination OS at the time an OS switching instruction is specifically issued by the OS switching instruction issuer.

According to the information processing apparatus 1 of the present embodiment, the monitor 200 is enabled to automatically detect an interrupt state, and the registers to be saved may be reduced without providing the mode use notifier 207 and the handler policy setters 304 and 404. Thus, OS switching may be accelerated while using, as the OS, the configuration of an existing OS to the full.

Additionally, according to the configuration in FIG. 12, the mode use information and the handler policy information are not used in the determination of the register to be saved. Thus, especially in the case of other than an interrupt-related mode, the banked register is always to be saved, and register saving is possibly performed also in the case where a mode is not actually used. Also, depending on the design of the interrupt handler of the OS, even if the interrupt process is completed, if the register is destroyed, the OS may not operate property. According to the configuration in FIG. 17, the register to be saved is determined based not only on the information regarding an interrupt but also on the mode use information and the handler policy information. It is thereby possible to cope with the problem described above. In the following, this configuration will be described.

Figure 17:
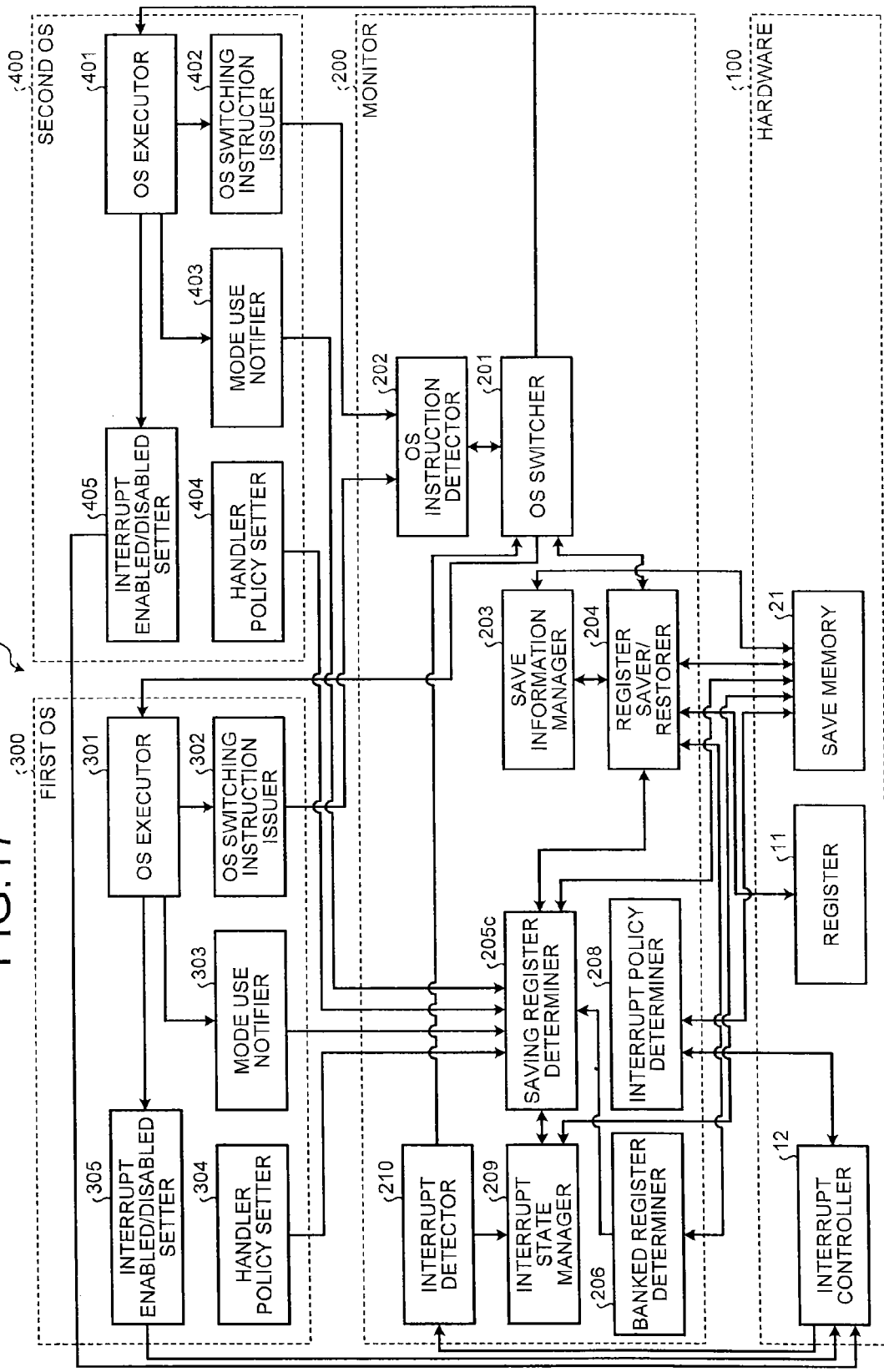
FIG. 17 is a block diagram illustrating a functional configuration of software of an example modification of the third embodiment.

FIG. 17 differs from FIG. 12 in that OSs 300 and 400 include handler policy setters 304 and 404, respectively, and mode use notifiers 303 and 403, respectively. Also, the internal processing of a saving register determiner 205*c* is also different. Additionally, also with the configuration in FIG. 17, it is assumed that interrupt input enabled/disabled information, mode use information and handler policy information do not change from OS activation to the end. In the following, the configuration in FIG. 17 will be describing, focusing mainly on the differences to FIG. 12.

The saving register determiner 205*c* has a function of performing setting of a handler policy for each mode of each OS according to a request from the handler policy setter 304 or 404, and a function of determining whether the register needs to be saved for each mode. In the case there is a setting request from the handler policy setter 304 or 404, the hander policy section of a hander policy setting source OS in FIG. 18 is updated. The values that can be set are four states, i.e. "interruptible", "not interruptible", "destroyable" and "not destroyable".

Interruptible and not interruptible are set in the case of outside an interrupt mode, that is, in the case of the SVC mode and the USR mode, for example. Due to the design of the OS, whether OS switching is possible during execution of a mode is indicated, and interruptible is set in the case OS switching possibly occurs, and not interruptible is set in the case OS switching does not possibly occur. Destroyable and not destroyable are set in the case of an interrupt mode, that is, in the case of the IRQ mode and the FIQ mode, for example. Due to the design of the OS, whether a banked register may be destroyed or not is set in the case an interrupt process is completed. On the other hand, in determining whether register saving is necessary or not for each mode, the method of determining whether the banked register for each mode needs to be saved or not is different from the embodiments described above.

First, the saving register determiner 205*c* determines, based on the interrupt state section in the table in FIG. 18, whether a mode is an interrupt-related mode or not. That is, an interrupt-related mode may be determined if other than "--" is set in the interrupt state section. Moreover, in the case of an interrupt-related mode, whether an interrupt is being processed or not is determined based on the "interrupt state" section in the table in FIG. 18. In the case an interrupt is being processed, if there is a possibility that another OS destroys the register, the banked register for the mode has to be saved.

In the case an interrupt process is completed, whether the register may be destroyed or not is determined based on the "handler policy" section in the table in FIG. 18. In the case "destroyable" is set and the register may be destroyed, register saving is not necessary. In the case "not destroyable" is set and register destruction is not possible, if there is a possibility of another OS destroying the register, the banked register for the mode has to be saved. On the other hand, in the case a mode is other than an interrupt-related mode, whether the switching source OS handles the mode is determined based on the "mode use" section in FIG. 18, and in the case the mode is not used, it is determined that register saving is not necessary. On the other hand, in the case the mode is used, whether there is a mode interruption or not is determined based on the handler policy section in the table in FIG. 18, and in the case there is an interruption, if there is a possibility of another OS destroying the register, saving of the banked register for the mode is necessary. In the case interruptible is set in the handler policy section, it is determined that there is a mode interruption, and in the case not interruptible is set in the section, it is determined that there is no mode interruption. With respect to whether another OS possibly destroys the register, in the case a mode of each OS is an interrupt-related mode, an interrupt is not input if interrupt disabled is set for the OS, and there is no possibility of the banked register for the mode being destroyed, and thus, it is determined that register saving is not necessary. That is, it is determined that register saving is necessary in the case the interrupt state in FIG. 18 is "complete" or "processing", that is, in the case interrupt enabled is set. On the other hand, in the case the mode is other than an interrupt-related mode, whether the mode is to be used or not is determined based on the mode use section in the table in FIG. 18, and if there is no OS that uses the mode, there is no possibility of register destruction, and it is determined that register saving is not necessary. On the other hand, there is provided a function of determining that register saving is necessary if there is an OS that uses the mode. In the case it is determined that register saving is necessary, the saving register determiner 205c acquires the list of banked registers for the mode from the banked register determiner 206, and returns the same to the call-up source.

The mode use notifier in FIG. 17 has a function that is approximately the same as that of the mode use notifier in FIG. 8A. Moreover, the handler policy setters 304 and 404 in FIG. 17 notify the saving register determiner 205c of "interruptible", "not interruptible", "destroyable" or "not destroyable" with respect to each mode.

In the case of an interrupt-related mode, the saving register determiner 205c determines whether an interrupt is being processed or not, based on the interrupt state section in FIG. 18, and in the case of other than an interrupt-related mode, the saving register determiner 205c determines whether the mode is used or not, based on the mode use section. Furthermore, the saving register determiner 205c determines whether another OS possibly destroys the banked register or not, based on the interrupt acceptability information and the mode use section, and automatically determines whether the banked register needs to be saved or not.

Figure 19:
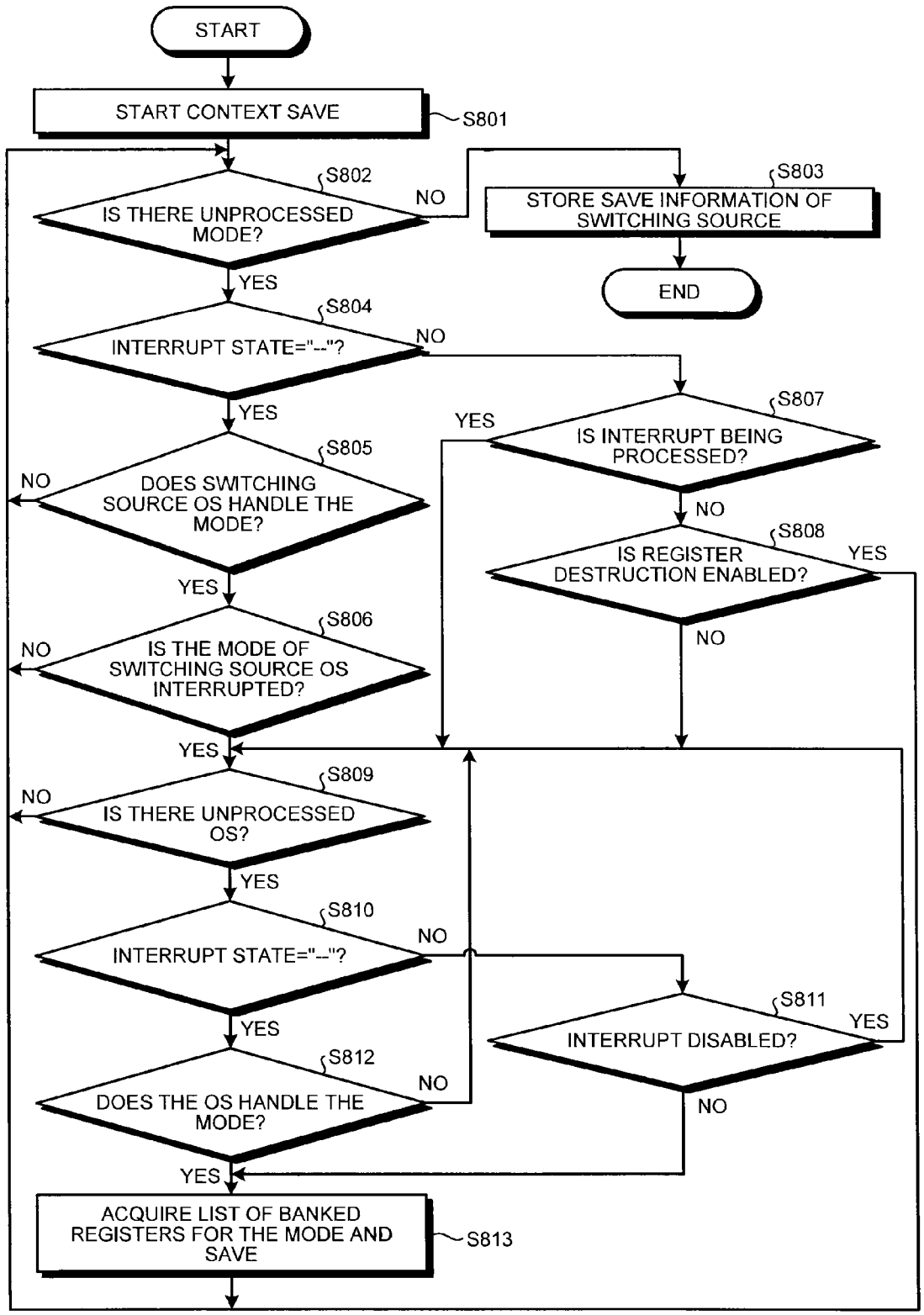
FIG. 19 is a flow chart illustrating a process of a context save process of the example modification of the third embodiment.

Next, a procedure of a context save process at the time of OS switching illustrated by the flow chart in FIG. 19 will be described. Additionally, FIG. 19 extracts, and illustrates, the processes corresponding to steps S207 to S212 in FIG. 6, and other processes are the same as those in FIG. 6.

When the context save process is started (step S801), in order to first determine whether the banked registers for all the modes need to be saved, the register saver/restorer 204 determines whether there is an unprocessed mode (step S802). In the case it is determined that there is no unprocessed mode (step S802: No), the register saver/restorer 204 requests the save information manager 203 to store the information of a saved banked register, and the save information manager 203 updates the previous save section in the table in FIG. 18, and ends the process (step S803).

In the case it is determined that there is an unprocessed mode (step S208: Yes), one piece of unprocessed mode information is extracted, and the saving register determiner 205c determines whether the mode is an interrupt-related mode or not. As the method of determining at this time, whether the interrupt state section for the mode of the switching source OS is "--" or not is determined, and the mode is determined to be an interrupt-related mode in cases other than "--" (step S804). In the case an interrupt-related mode is determined (step S804: No), the saving register determiner 205c determines whether the OS is currently processing an interrupt for the mode or not, by acquiring an interrupt state from the interrupt state manager 209 (step S807). That is, an interrupt is being processed if the interrupt state section, in FIG. 18, of the mode of the switching source OS is "processing", and in other cases, it is determined that an interrupt is not being processed.

In the case it is determined that an interrupt is not being processed (step S807: No), the saving register determiner 205c determines whether the register may be destroyed or not, based on the handler policy section of the mode of the switching source OS (step S808). In the case it is determined that destruction is allowed (step S808: Yes), it is determined that the banked register for the mode does not have to be saved, and the process returns to step S802 to perform processing for the next mode.

In the case it is determined that not destroyable is set in the handler policy section (step S808: No), if there is a possibility of another OS destroying the banked register for the mode, the banked register has to be saved, and thus, the process proceeds to step S809 where it is determined whether another OS possibly destroys the register or not.

On the other hand, in the case it is determined that a mode being processed is not an interrupt-related mode (step S804: Yes), the saving register determiner 205c determines whether the switching source OS handles the mode or not (step S805). In the case it is determined that the mode is not handled (step S805: No), saving of the banked register for the mode is determined to be unnecessary, and the process returns to step S802.

On the other hand, in the case it is determined that the mode is handled (step S805: Yes), the saving register determiner 205c determines, based on the handler policy section in FIG. 18, whether OS transition may take place during processing in the mode of the switching source OS and an interruption may occur (step S806). In the case of not interruptible (step S806: No), the saving register determiner 205c determines that saving of the banked register for the mode is not necessary, and returns to step S802.

On the other hand, in the case of interruptible (step S806: Yes), if there is a possibility of another OS destroying the banked register for the mode, the banked register needs to be saved, and thus, the saving register determiner 205c proceeds to the process of determining whether another OS possibly destroys the register or not. Specifically, first, the saving register determiner 205c determines whether an OS other than the switching source OS possibly destroys the banked register for the mode. This is because, if there is no possibility of destruction, the banked register for the mode does not have to be saved. First, in order to determine, for all the OSs other than the switching source OS, whether the OS possibly destroys the banked register for the mode, the saving register determiner 205c determines whether there is an unprocessed OS among operating OSs (step S809). In the case the determination has been performed for all the OSs, and it is determined that there is no unprocessed OS (step S809: No), the saving register determiner 205c determines that saving of the banked register for the mode is not necessary, and returns to step S802.

In the case it is determined that there is an unprocessed OS (step S809: Yes), the saving register determiner 205c extracts one OS among the unprocessed OSs, and determines whether the mode is an interrupt mode, based on whether the interrupt state section in FIG. 18 is "--" or not (step S810). In the case other than "--" is determined (step S810: No), the saving register determiner 205c determines that the mode is an interrupt mode, and determines whether an interrupt is disabled, that is, whether the interrupt state section for the mode of the OS is "invalid" or not (step S811).

In the case invalid is determined (step S811: Yes), whether interrupt disabled is set and there is no possibility of register destruction is determined, and the process returns to step S809 to perform determination for the next OS. On the other hand, in the case the interrupt state section is other than "invalid" (step S811: No), there is a possibility that an interrupt input will be performed, and that the register will be destroyed, and the register saver/restorer 204 acquires the list of banked registers for the mode via the banked register determiner 206, and performs a save process with respect to the save memory 21 (step S813).

On the other hand, in the case the interrupt state section of the OS for the mode being processed is "--" in step S810 (step S810: Yes), that is, in the case other than the interrupt mode is determined, the saving register determiner 205c determines whether the OS handles the mode or not, based on the mode use section in FIG. 18 (step S812). In the case the mode is not handled (step S812: No), the process returns to step S809 to perform determination for the next OS.

On the other hand, in the case the mode is handled (step S812: Yes), there is a possibility that the banked register for the mode will be destroyed, and the saving register determiner 205c acquires the list of banked registers for the mode, and performs a process of saving the values of the registers (step S813). Then, the process returns to step S802 to perform processing for the next mode.

Figure 15:
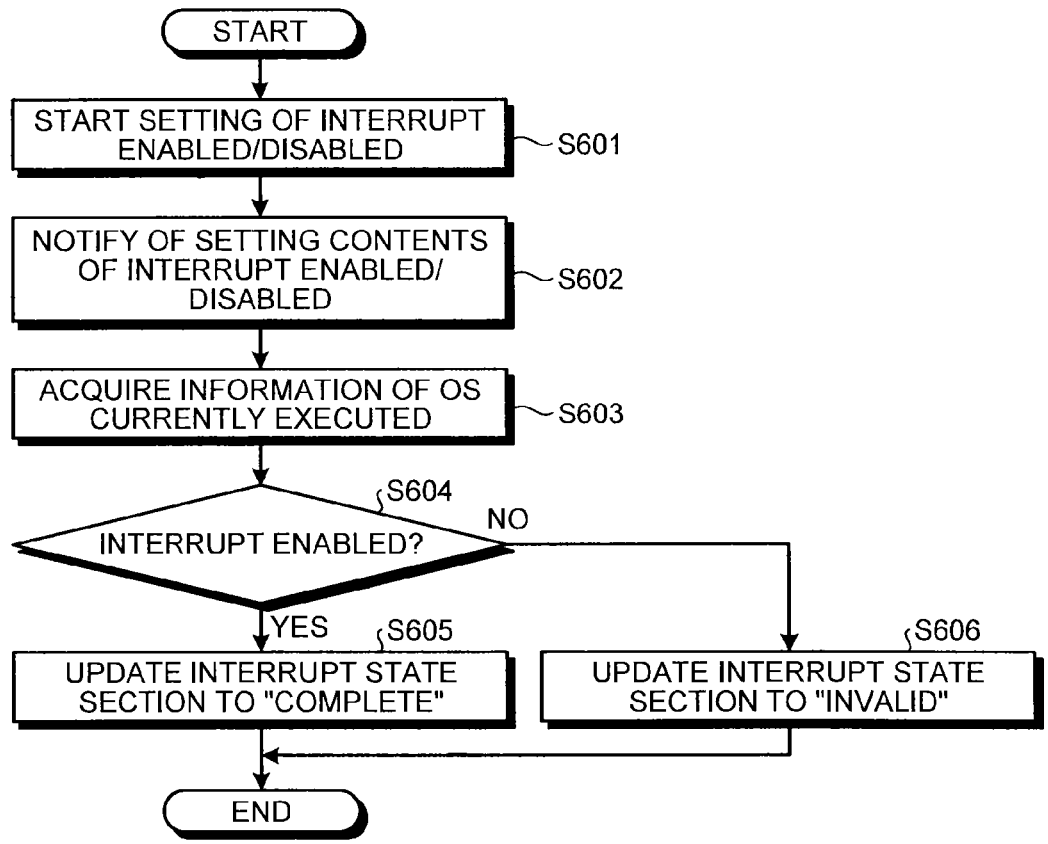
FIG. 15 is a flow chart illustrating a processing flow at the time of interrupt setting of the third embodiment.
Figure 16:
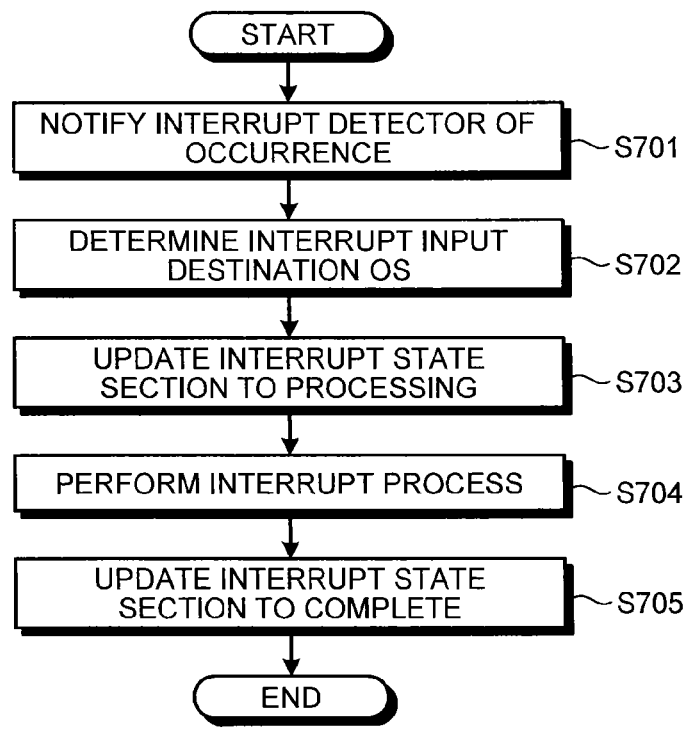
FIG. 16 is a flow chart illustrating a processing flow at the time of occurrence of an interrupt of the third embodiment.

Also, the procedure at the time of setting interrupt enabled/disabled and the process at the time of occurrence of an interrupt are the same as those in FIG. 15 and FIG. 16, respectively. As illustrated by the flow chart in FIG. 19, in the present embodiment, first, whether a mode is an interrupt mode or not is determined in step S804. In the case of an interrupt mode, determination of whether this mode is handled or not will not be performed later. This is because whether the interrupt mode is used or not may be determined by detecting the setting regarding interrupt acceptability that is set for interrupt control. That is, with respect to the interrupt-related mode, the OS does not have to specifically notify the saving register determiner 205c, by using the mode use notifier, whether the mode is used or not. Thus, the structure of the mode use notifier may be simplified. Also, with the present configuration, whether a register needs to be saved is determined based not only on whether an interrupt mode is used or not, but also on information indicating whether an interrupt is actually being processed or not and the like, and thus, saving of the banked registers for the interrupt-related mode may be more reduced compared to the case in the first embodiment. Moreover, unlike the configuration in FIG. 12, handler policy information is referred to, and the method may be used also for an OS whose register should not be destroyed at the time of completion of an interrupt. Furthermore, since whether a banked register needs to be saved or not is determined based on the mode use information also for other than the interrupt-related mode, the register saving/restoration process may be omitted depending on the mode use status.

Figure 20A:
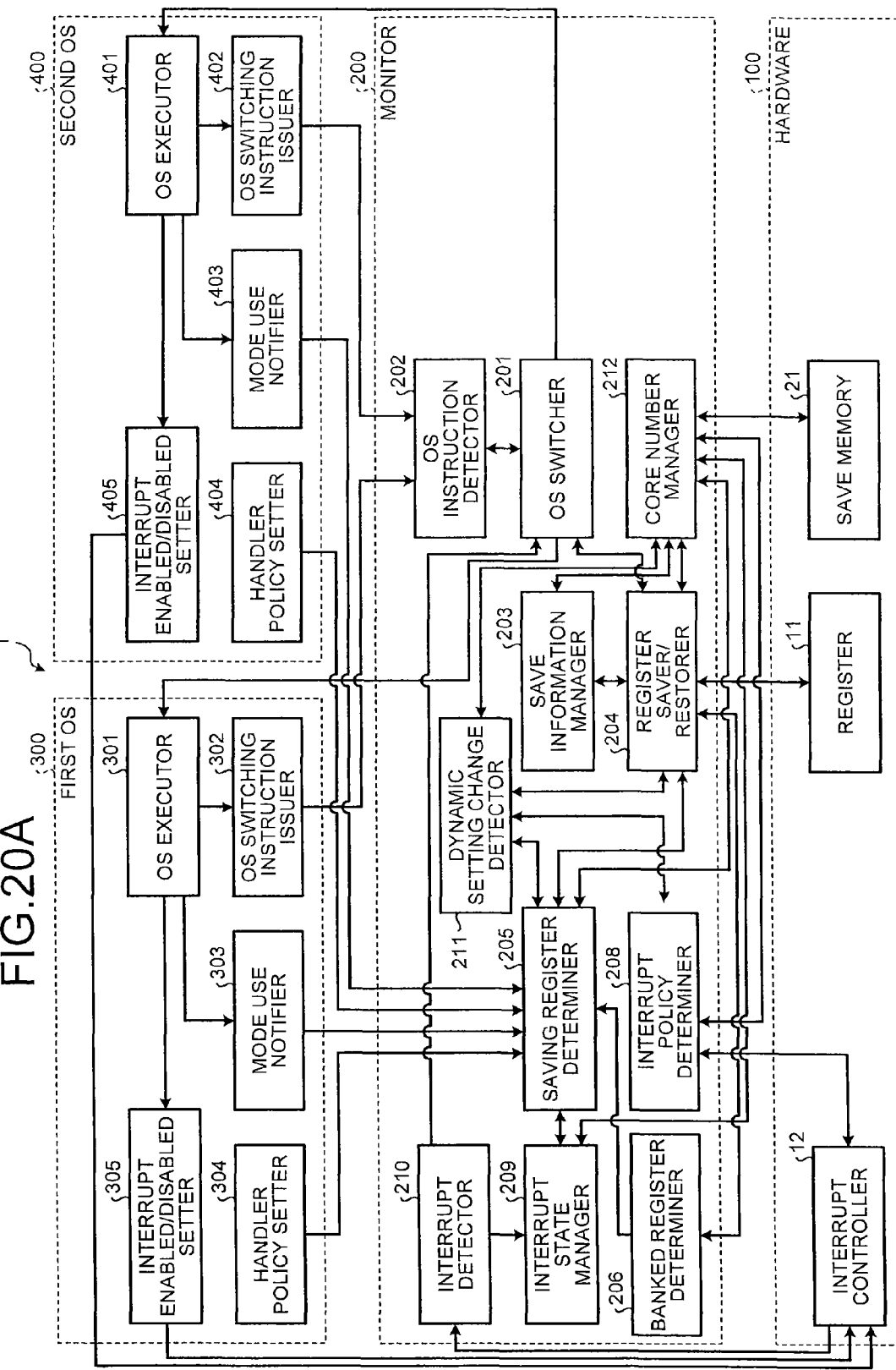
FIG. 20A is a block diagram illustrating a software configuration of the example modification of the third embodiment.

Furthermore, with the configuration of the present embodiment, presence/absence of handling of a mode and of an interrupt is fixed at the time of activation, and is assumed not to change afterward. Also, with respect to the CPU 10, in either of a single core processor or multicore processor environment, it is assumed that OS switching occurs only on one core, and the OS to be operated is fixed for other cores. In recent years, multicore processors are widespread, from servers to embedded devices, and it is desirable if OS switching can be flexibly performed on all the cores of the multicore processor. FIG. 20A illustrates an information processing apparatus including functions for dynamic setting change and OS switching on all the cores of a multicore processor.

FIG. 20A differs from FIG. 17 in that a dynamic setting change detector 211 and a core number manager 212 (core manager) are provided. Also, according to the configuration in FIG. 17, the register saver/restorer 204, the interrupt state manager 209, and the like directly access the save memory 21 at the time of accessing the save memory 21, and the configuration in FIG. 20A is different therefrom in that the save memory 21 is accessed via the core number manager 212. In addition, the structure of the saving register management table, in FIG. 21, existing in the save memory 21, for context saving and the like is also different.

In the case OS switching takes place or an interrupt is detected, the core number manager 212 determines the core where the cause thereof has occurred. For example, in a case an OS switching instruction is called up by the OS being executed on a core 1, it is determined that an OS switching request is generated by the core 1. According to a multicore processor, normally, each core has a register, and is capable of operating in a separate mode. For example, it is possible to operate the first OS 300 in the SVC mode on the core 1, and to operate the second OS 400 in the IRQ mode on a core 2. In this case, to perform OS switching on a per-core basis, register saving/restoration needs to be performed on a per-core basis. Thus, the core number manager 212 is provided. Furthermore, the core number manager 212 has a function of receiving requests for accessing the table in FIG. 21 that is managed by the save memory 21 in the case of change or acquisition of an interrupt state by the interrupt state manager 209 or the like, saving and restoration of a register by the register saver/restorer 204, setting and setting acquisition with respect to the previous save section by the save information manager 203, and the like, and of storing and returning information on a per-core basis. For this purpose, the data table arranged in the save memory 21 has a data structure allowing a state to be set for each core with respect to an interrupt state column, a context save area column, and a previous save column, as illustrated in FIG. 21. For example, when saving of a banked register for the SVC mode of the first OS 300 is to be performed by the register saver/restorer 204, the core number manager 212 receives the save request, and if the processor for which the save request has been issued is the core 1, the value of the register is saved by the core number manager 212 in the section of the SVC mode for the core 1 in FIG. 21, and if the processor is the core 2, the value of the register is saved in the section for the core 2.

The dynamic setting change detector 211 is called up by the interrupt policy determiner 208 or the saving register determiner 205 at the time of setting change, and detects a change in a case a mode use setting change or an interrupt setting change takes place after OS activation. For example, in the case there are the first OS 300 and the second OS 400, and the first OS 300 is set to handle the USR mode and the second OS 400 is set to not handle the USR mode, register saving is not necessary at the time of switching from the first OS 300 to the second OS 400. At this time, if the setting of the second OS 400 is changed to handle the USR mode, the banked register for the USR mode is possibly overwritten in spite of not being saved. If it is overwritten, when switching to the first OS 300 takes place, a program, of the first OS 300, operating in the USR mode possibly operates in a way not intended by the designer of the program. Accordingly, the banked register of the first OS 300 needs to be saved before execution of the second OS 400 in the USR mode. Thus, the dynamic setting change detector 211 determines which OS uses the mode regarding which setting has been changed. Also, in the case an interrupt is invalidated or a mode is set not to be used, or in the case another OS does not use the mode, or in the case register saving is not necessary according to the design of the handler, the mode is used by a plurality of OSs, and thus, if register saving is performed in advance, register saving does not have to be performed again. Accordingly, the dynamic setting change detector 211 determines whether handling of a mode is validated or an interrupt is changed to valid. Furthermore, in the case a setting is validated, if the contents of setting are a change in the mode use setting, the dynamic setting change detector 211 searches the data table in FIG. 21, via the core number manager 212, for an OS, other than the setting source OS, whose setting indicates that the mode is used and the handler policy is interruptible. Then, in the case only one OS is found as a result of the search, the dynamic setting change detector 211 saves the banked register for the mode in the context save area of the OS which has been found. On the other hand, in the case no OS is found or two or more OSs are found, the dynamic setting change detector 211 returns to the process which was being performed before a change in the setting was detected without doing anything.

Also, if the setting is change of the interrupt setting, the dynamic setting change detector 211 searches for an OS, other than the setting source OS, for which the interrupt state section is "processing" or the handler policy is "not destroyable" for the mode, and in the case only one OS is found as a result, the banked register for the mode is saved in the context save area of the OS which has been found, that is, the OS for which "processing" is set or "not destroyable" is set for the handler policy. In the case no OS is found or two or more OSs are found, nothing is done. Furthermore, in the case the banked register is saved, the dynamic setting change detector 211 updates the previous save section of the mode of the OS to "yes". Also, after the process is completed, the dynamic setting change detector 211 performs again the process which was being performed before detection of a change in the setting.

When notified of the mode use information or the handler policy information, the interrupt policy determiner 208 calls up the dynamic setting change detector 211. Also, when interrupt enabled/disabled setting is performed, the interrupt policy determiner 208 calls up the dynamic setting change detector 211.

Also, there is a difference to the configuration in FIG. 18 in that blocks that access the save memory 21, such as the register saver/restorer 204, the interrupt state manager 209, the interrupt policy determiner 208, the dynamic setting change detector 211 and the save information manager 203, do not directly issue an access instruction to the save memory 21 but issue the access instruction to the core number manager 212.

Figure 22:
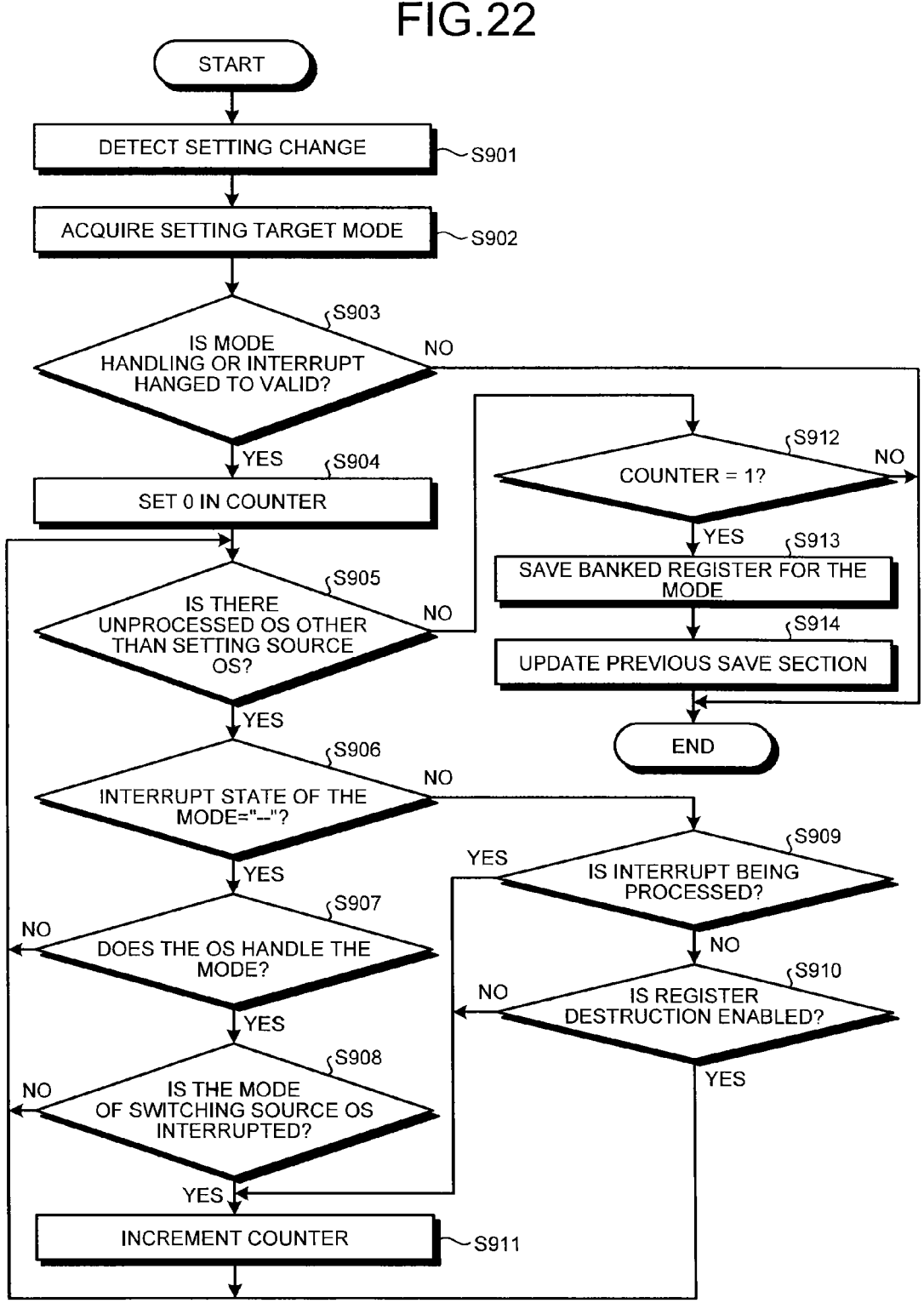
FIG. 22 is a flow chart illustrating a process flow at the time of dynamic setting change of the example modification of the third embodiment.

Next, the flow of dynamic setting change will be described with reference to the flow illustrated in FIG. 22. First, when a change in setting is detected (step S901), the dynamic setting change detector 211 acquires the mode which is the setting target (step S902). For example, in the case the IRQ is set to valid, the IRQ mode is acquired, and in the case the SVC mode is set to be used, the SVC mode is acquired.

Next, the dynamic setting change detector 211 acquires the contents of the setting, and determines whether mode handling or an interrupt is validated (step S903). In the case invalidation is determined (step S903: No), there is no possibility of register destruction, and the process is ended.

In the case validation is determined (step S903: Yes), the dynamic setting change detector 211 further sets an OS counter to zero (step S904). Next, to perform processing for each OS, the dynamic setting change detector 211 determines whether there is an unprocessed OS, other than the setting source OS (step S905). In the case it is determined that there is an unprocessed OS (step S905: Yes), information about the OS is extracted via the core number manager 212 from the table in FIG. 21, the value in the interrupt state section of the setting target mode is acquired, and whether "--" is set or not is determined (step S906).

In the case it is determined that "--" is set for the interrupt state (step S906: Yes), the dynamic setting change detector 211 determines other than the interrupt-related mode, and acquires from the mode use section via the core number manager 212, and determines, whether the OS handles the mode or not (step S907). In the case it is determined that the mode is not handled (step S907: No), the process returns to step S905 to perform processing for the next OS. In the case it is determined that the mode is handled (step S907: Yes), the dynamic setting change detector 211 acquires from the handler policy section in FIG. 21 via the core number manager 212, and determines, whether there is an interruption in the mode for the switching source OS (step S908).

In the case it is determined that there is an interruption (step S908: Yes), the counter is incremented (step S911), and the process returns to step S905 to perform processing for the next OS. In the case it is determined that there is no interruption (step S908: No), the process directly returns to step S905.

In the case it is determined in step S906 that "--" is not set for the interrupt state, that is, in the case an interrupt mode is determined (step S906: No), the dynamic setting change detector 211 acquires from the saving register management table in FIG. 21 via the core number manager 212, and determines, whether an interrupt is being processed or not (step S909). In the case it is determined that an interrupt is being processed (step S909: Yes), the dynamic setting change detector 211 increments the counter (step S911), and returns to step S905.

On the other hand, in the case an interrupt is not being processed, the dynamic setting change detector 211 determines whether register destruction is allowed or not, based on the table in FIG. 21 and via the core number manager 212 (step S910). In the case it is determined that destruction is allowed (step S910: Yes), the process returns to step S905. On the other hand, in the case it is determined that destruction is not allowed (step S910: No), the dynamic setting change detector 211 increments the counter, and returns to step S905.

Also, in the case it is determined in step S905 that processing is completed for all the OSs other than the setting source OS (step S905: No), the dynamic setting change detector 211 determines whether the counter is one (step S912). In the case the counter is determined to be one (step S912: Yes), it is determined that the banked register for the mode is not saved but saving of the banked register has become necessary due to the change in the setting, and the dynamic setting change detector 211 saves the banked register for the mode in the save area of the OS with respect to which the counter has been incremented (step S913), changes the previous save section to "yes", and ends the process (step S914). In the case the counter is zero (step S912: No), or two or more, it is determined that register saving is not necessary or that register saving has already been performed, and the process is directly ended.

Figure 20B:
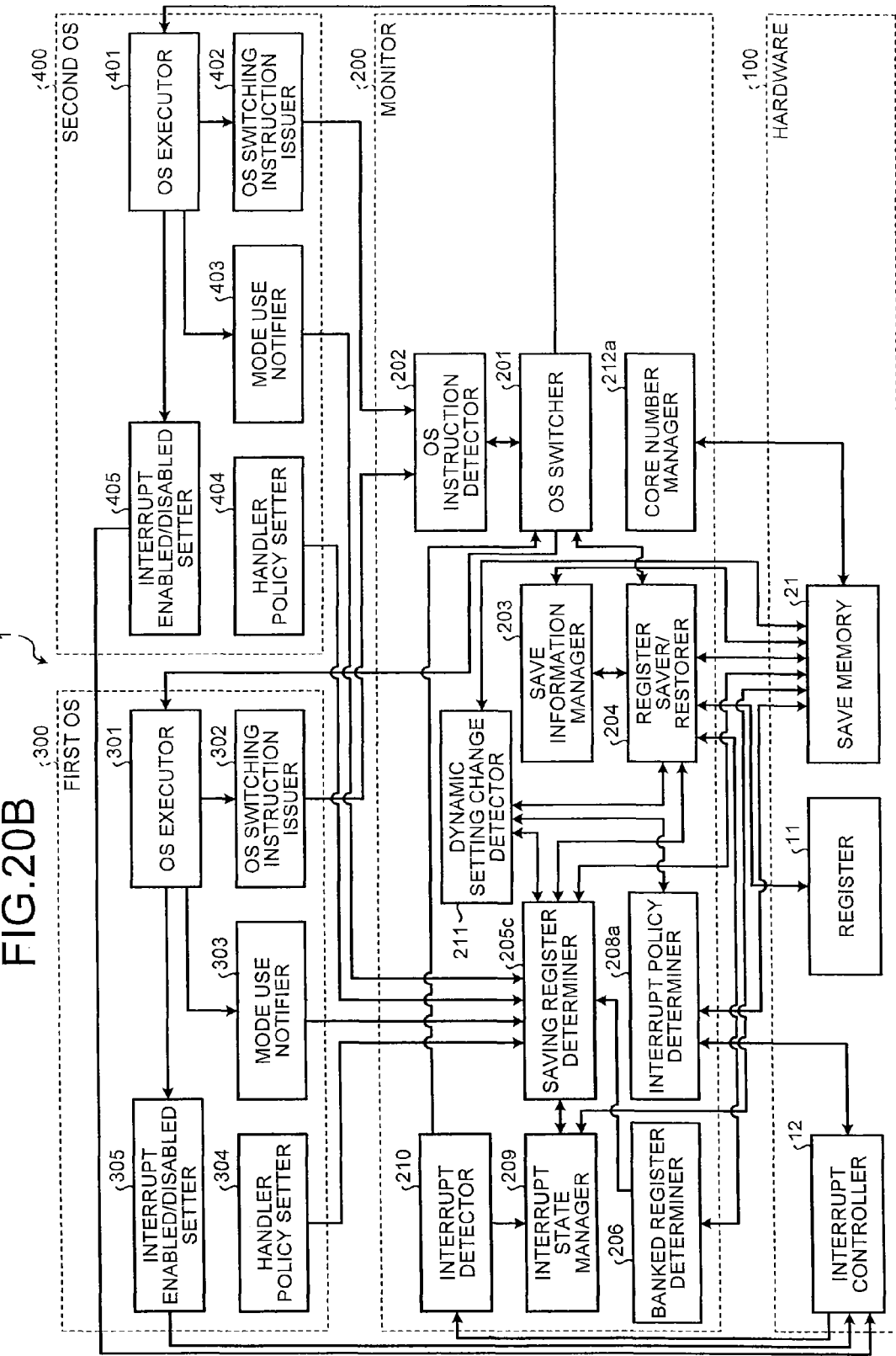
FIG. 20B is a block diagram illustrating a functional configuration of the software of the example modification of the third embodiment.

Also, in contrast to FIG. 20A where the save memory 21 is accessed via the core number manager 212, access to the save memory 21 may be detected by a core number manager 212a and the access destination may be automatically changed for each core as in FIG. 20B. That is, also in the case blocks that access the save memory 21, such as the register saver/restorer 204 and the like, request for access to the same address, the core number manager 212a may detect the access request, and make a change such that an address which is different for each core is accessed. For example, in the case there is access to address a, N is given as a constant number and the instruction is changed such that address a is accessed when the access is from core 0, address a+N is accessed when the access is from core 1, and address N×b is accessed when the access is from core b. This enables blocks that access the save memory 21, such as the register saver/restorer 204 and the like, to store in, and acquire from, data in an area different for each core while making it seem like the same address is being accessed.

In this case, in addition to the function of determining, when OS switching has taken place or an interrupt has been detected, the core where the cause has occurred, the core number manager 212a detects, when change or acquisition of an interrupt state by the interrupt state manager 209, saving or restoration of a register by the register saver/restorer 204, or setting or setting acquisition regarding the previous save section by the save information manager 203 takes place, a request for saving, restoration, setting or setting acquisition, and stores or returns information in a different area in the save memory 21 on a per-core basis.

According to the present embodiment, with respect to a certain mode, a function of issuing a mode use notification from the OS does not need to be provided to the monitor, and thus, the OS may be simplified, and the conventional OS design may be utilized to the full. Also, by grasping the state of interrupt on the monitor side, register saving may possibly be reduced also in the case of the OS using an interrupt-related mode, and OS switching may be further accelerated. Furthermore, according to the present embodiment, OS switching may be accelerated in an environment, such as a multicore processor environment, whose use is becoming widespread in recent years. Also, there is no need to list in advance the hardware resources to be used by tasks, and the register information to be saved may be automatically determined based on interrupt process completion information or the like.

Fourth Embodiment

The object of each embodiment described above is to minimize the number of banked registers that are to be saved and to accelerate OS switching. This implies that, in the case register saving and restoration are not performed, the value of a register set at the switching source OS may also be accessed by the switching destination OS. However, there are cases where a register value is desirably not accessed for security reasons, such as a case of performing an encryption process where key data for encrypting data is set in a register, for example. Also, in the case the switching destination OS possibly destroys the register value and is not to be relied upon, the operation of the switching source OS may be affected. Accordingly, in the case a register value should not be read for security reasons, or in the case improper overwriting may be performed, even if register saving may be omitted from the standpoint of acceleration, the register needs to be saved, and the value of the register needs to be rewritten to a value irrelevant to the original value.

Figure 23:
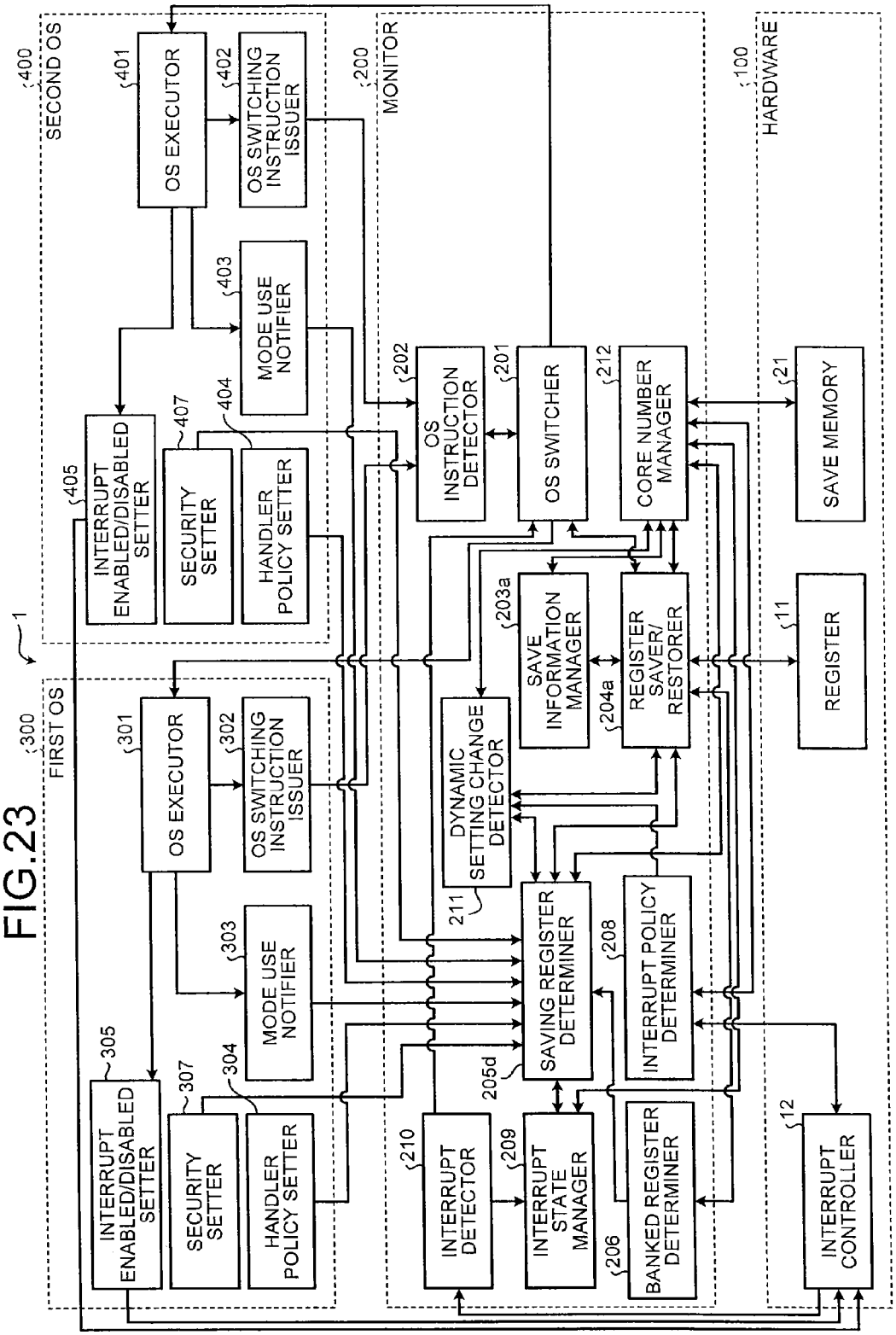
FIG. 23 is a block diagram illustrating a functional configuration of software of a fourth embodiment.

In a fourth embodiment, an information processing apparatus that accelerates OS switching while taking security into account will be described. FIG. 23 illustrates examples of hardware including a CPU 10 and a main storage unit 20, and a software configuration that is operated by the CPU 10. FIG. 23 differs from FIG. 20A in that a first OS 300 includes a security setter 307, and in the functions of a saving register determiner 205d, a register saver/restorer 204a, and a save information manager 203a. Also, the structure of the table illustrated in FIG. 24 that is stored in a save memory 21 is also different in relation to context save and setting.

The security setter 307 notifies the saving register determiner 205d of the monitor 200 of whether a security setting is valid or invalid. The security setting is validated in the case a register should not be read by another OS or in the case the value of a register should not be destroyed by an unreliable OS in an environment where the unreliable OS operates. In the case an unreliable OS does not operate, or no problem arises even if a register which is not saved is destroyed, or no trouble arises even if the register value is read, the security setting is set to invalid. For example, in the case only the SVC mode is used by the first OS 300 and the second OS 400, only the banked registers for the SVC mode are used, and the banked registers for the SVC mode need to be saved. On the other hand, the banked registers for other modes are not used, and no problem arises even if they are destroyed or read, and thus, the security setting may be set to invalid. Since the security requirements are different for each OS, the security setter 307 is provided for each OS.

The saving register determiner 205d has functions of setting the handler policy for each mode of each OS according to requests from handler policy setters 304 and 404, and also, of receiving information of validity or invalidity of a security setting from the security setter 307 and updating a security validity section of the table, illustrated in FIG. 24, that is stored in the save memory 21. With respect to the function of determining whether register saving for each mode is necessary or not, the contents of the process are different from those described in the third embodiment.

Of the functions, with respect to the function of receiving information of validity or invalidity of a security setting and updating a security validity section, the saving register determiner 205d receives information of either security valid or invalid from the security setter 307, and updates the security validity section of the setting source OS in the table in FIG. 24 to valid or invalid. In the second embodiment, the saving register determiner 205d determines whether each mode is an interrupt-related mode or not, and in the case of an interrupt-related mode, determines whether an interrupt is being processed. In the present embodiment, after determining an interrupt-related mode, the saving register determiner 205d first determines whether the security setting of the switching source OS is "valid" or not. In the case the security setting is valid, the saving register determiner 205d determines that register saving is necessary. Moreover, there is also provided a function of setting a flag indicating that the mode needs to be cleared. On the other hand, in cases other than the interrupt-related mode, a function of determining, in the case the switching source OS handles the mode, whether OS switching possibly takes place during handling of the mode or not is provided in the second embodiment.

In the present embodiment, in the case the mode is handled, the saving register determiner 205d determines, before determining whether OS switching possibly takes place during handling of the mode, whether the security setting is valid, and in the case the security setting is valid, the saving register determiner 205d determines that register saving is necessary.

Moreover, a function is provided, in this case, of setting a flag indicating that the value of the banked register for the mode needs to be cleared. Accordingly, in the case there is a possibility that the mode is handled, the banked register for the mode may be saved without fail regardless of the interrupt process status or the setting of other OSs.

The register saver/restorer 204a resets the clear flag prepared for each mode every time there is a call-up from the OS switcher 201, checks the clear flag of each mode after the register to be saved is determined by the saving register determiner 205d, and in the case the clear flag is set, clears the value of the banked register for the mode. The register saver/restorer 204a may also acquire information about a register which is to be restored from the save information manager 203a, and may clear the banked register only in the case register restoration is not to be performed. This is because, in the case the banked register of the switching destination OS is to be restored, the contents of the banked register of the switching source OS are rewritten, and thus, do not have to be cleared.

Figure 25:
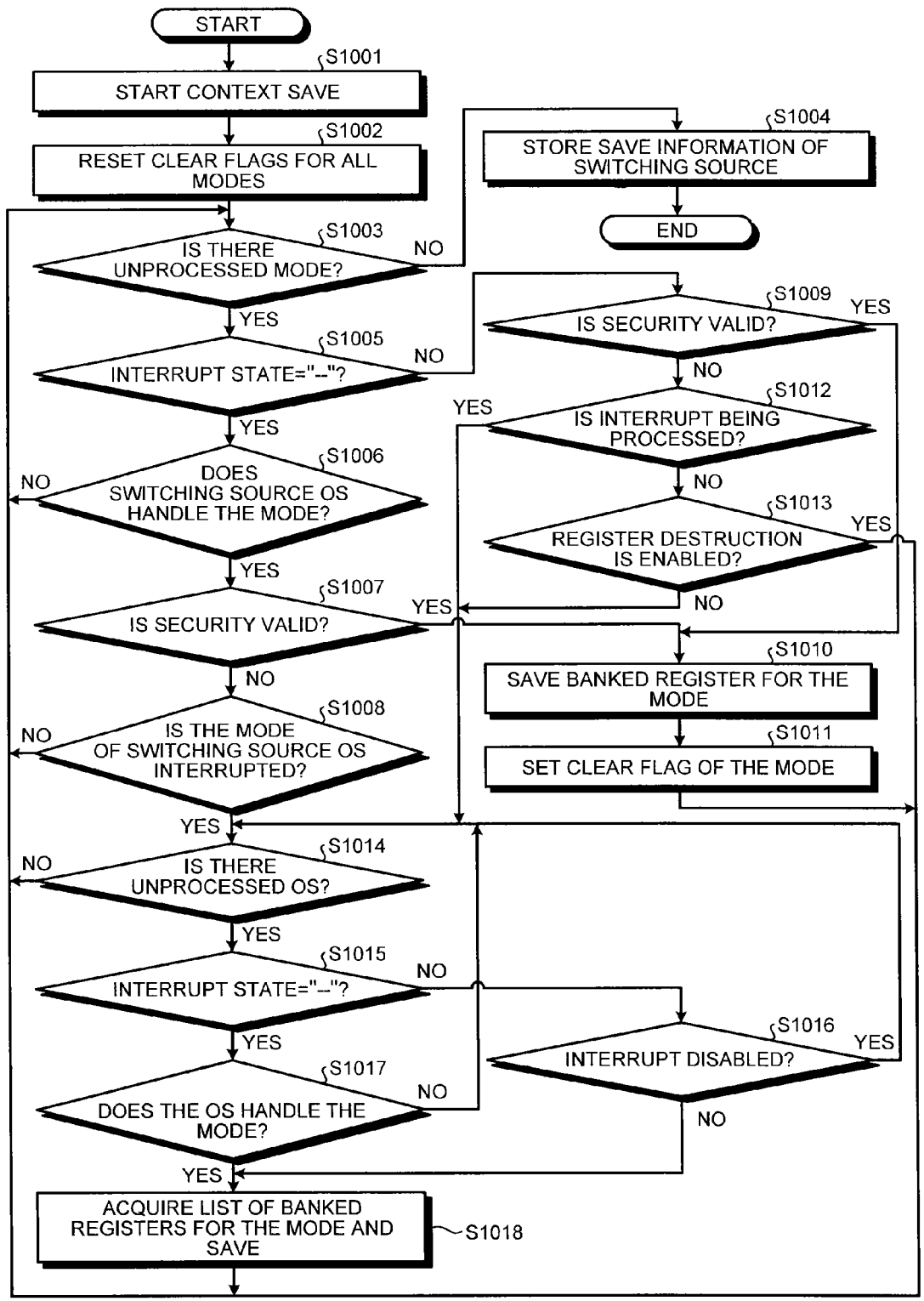
FIG. 25 is a flow chart illustrating a process of a context save process of the fourth embodiment.
Figure 26:
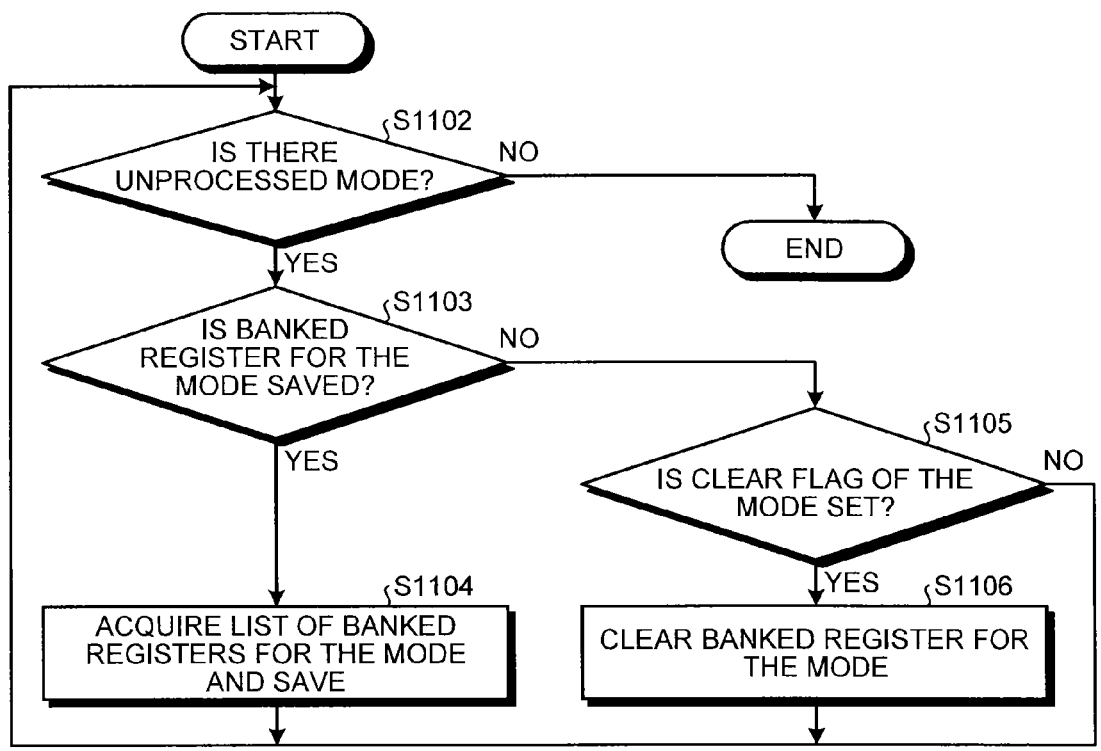
FIG. 26 is a flow chart illustrating a process of a context restoration process of the fourth embodiment.

Next, a procedure of context saving/restoration process at the time of OS switching illustrated by the flow charts in FIGS. 25 and 26 will be described. Additionally, FIGS. 25 and 26 extract, and illustrate, the processes corresponding to steps S207 to S212 in FIG. 6, and other processes are the same as those in FIG. 6. First, a procedure of the context save process in FIG. 25 will be described. Here, the processes of step S1005 and later and step S1002 that are different from the flow in FIG. 19 in the second embodiment will be described.

The saving register determiner 205d determines whether the mode for which determination is being performed is an interrupt-related mode or not, based on whether the interrupt state section of the switching source OS in the table in FIG. 24 is "--" or not (step S1005). An interrupt-related mode is determined if other than "--" (step S1005: No), and the saving register determiner 205d determines whether the security setting is "valid" or not (step S1009). If "valid" (step S1009: Yes), there is a problem if the register for the mode is viewed or destroyed by another OS, and the banked register for the mode is saved by the register saver/restorer 204a (step S1010), and the saving register determiner 205d sets the clear flag for the mode (step S1011). Then, the process returns to step S1003.

On the other hand, in the case it is determined in step S1005 that the interrupt state section is "--" (step S1005: Yes), the saving register determiner 205d determines whether the switching source OS handles the mode or not (step S1006). In the case it is determined that the mode is handled (step S1006: Yes), the saving register determiner 205d determines whether the security setting is "valid" or not (step S1007). In the case of valid (step S1007: Yes), the banked register for the mode is saved by the register saver/restorer 204a (step S1010), and then, the saving register determiner 205d sets the clear flag for the mode (step S1011). Then, the process returns to step S1003. Additionally, in the case the switching source OS does not handle the mode (step S1006: No), it is assumed that no problem will arise even if the banked register for the mode is viewed or destroyed, and thus, determination of whether the security setting is valid or not is not performed. Moreover, after the context save process is started, the register saver/restorer 204a first performs the process of resetting the clear flags for all the modes (step S1002).

Next, the procedure of the context restoration process illustrated by the flow chart in FIG. 26 will be described. First, to determine whether register saving is necessary for all the modes, the register saver/restorer 204a determines whether there is an unprocessed mode or not (step S1102). In the case there is no unprocessed mode (step S1102: No), the context restoration process is ended. On the other hand, in the case there is an unprocessed mode (step S1102: Yes), the register saver/restorer 204a extracts the mode, and requests the save information manager 203a to determine whether the banked register for the mode of the switching destination OS is saved or not (step S1103).

In the case it is determined that the register is saved (step S1103: Yes), the register saver/restorer 204a acquires the list of banked registers for the mode, acquires from, and restores, the values of the registers from the context save area in FIG. 24 (step S1104), and returns to step S1102. On the other hand, in the case it is determined that the banked register for the mode is not saved (step S1103: No), the register saver/restorer 204a determines whether the clear flag for the mode which was updated in the context save process is set or not (step S1105). In the case the clear flag is set (step S1105: Yes), the banked register for the mode is cleared (step S1106), and the process returns to step S1102. In the case the clear flag is not set (step S1105: No), the process directly returns to step S1102.

Figure 27:
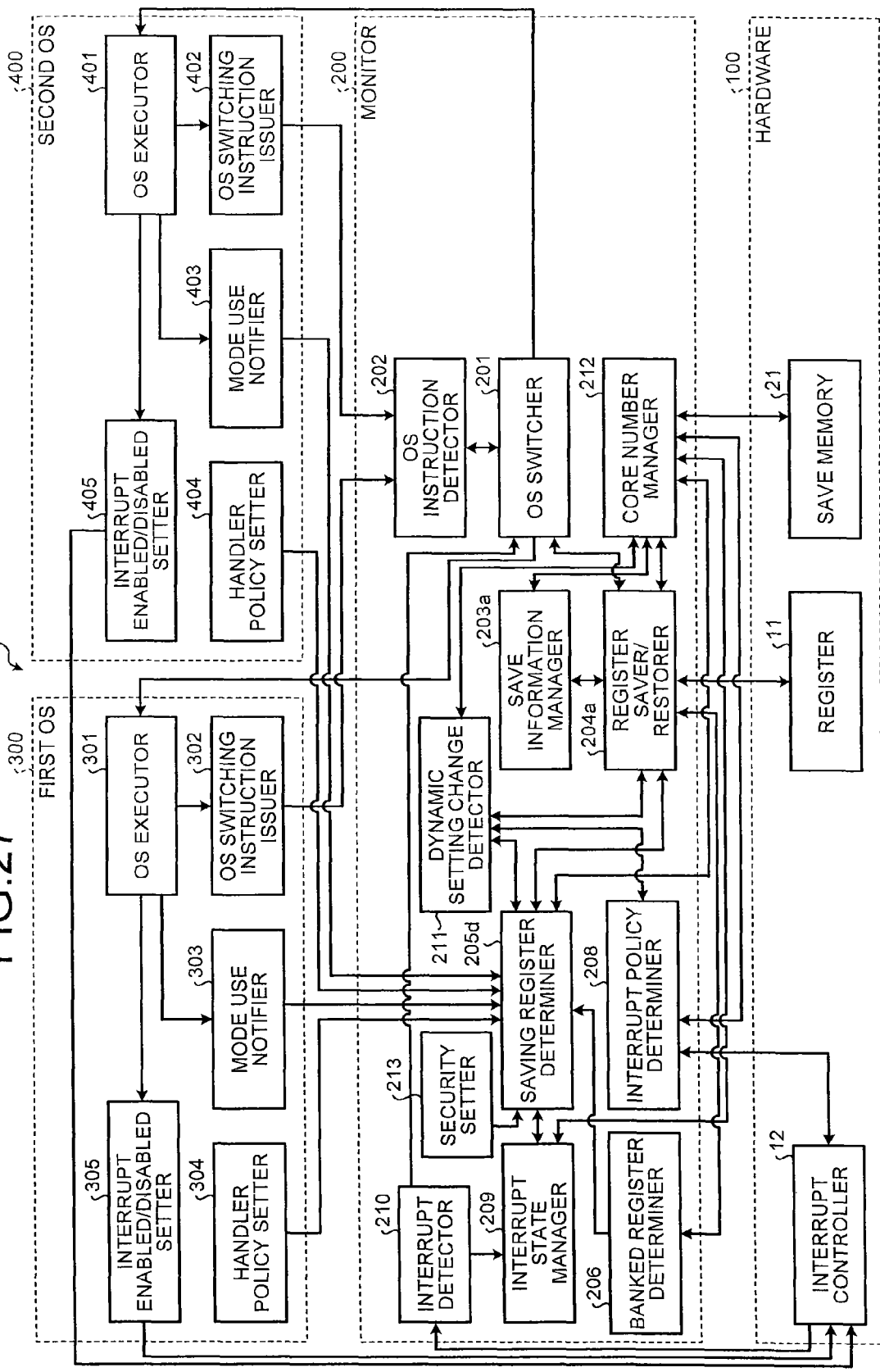
FIG. 27 is a block diagram illustrating a configuration of an information processing apparatus of an example modification of the fourth embodiment.

Additionally, according to the configuration in FIG. 23, the security setter 307 is provided inside the OS, but the configuration may be changed such that it is provided inside the monitor 200, as illustrated in FIG. 27. Particularly, a virtualization technique called TrustZone (registered trademark) is applied to an ARM processor in recent years. TrustZone is capable of operating two types of OSs, a secure OS and a non-secure OS, and it is premised on performing a process requiring tamper resistance on the secure OS side and performing a normal process on the non-secure OS side. Since operation of a reliable OS on the secure OS side is taken as a premise, malicious destruction of the register of the non-secure OS on the secure OS side does not have to be taken into account. On the other hand, with respect to the non-secure OS, a malicious program may enter, and there is a possibility of malicious destruction of the register. Accordingly, a configuration is conceivable according to which the security setter 213 is provided inside the monitor 200, and according to which the security setter 213 sets in advance the security validity section, in the table in FIG. 24, on the secure OS side to "valid" and the security validity section on the non-secure OS side to "invalid". Furthermore, although the handler policy setter 304 or 404 and the mode use notifier 303 or 403 are also provided to the OS, in the case the OS that is to operate is determined in advance, they may be provided to the monitor 200, as described in the first embodiment.

With the present embodiment, a monitor that accelerates OS switching while taking security concerns into account may be realized.

At least a part of the units of the information processing apparatus 1 described in the embodiments above may be configured by hardware or by software. In the case of configuration by software, programs for realizing at least a part of the functions of the apparatus/server may be stored in a storage medium, as a computer program product, such as a floppy (registered trademark) disk or a CD-ROM, and the programs may be read and executed by a computer. The storage medium is not restricted to a portable medium such as a magnetic disk or an optical disk, and it may be a fixed storage medium such as a hard disk device or a memory.

Also, programs for realizing at least a part of the information processing apparatus 1 may be distributed via a communication line (including wireless communication) such as the Internet. Moreover, the programs may be distributed via a wired or wireless line such as the Internet or by being stored in a storage medium, after being encrypted, modulated or compressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus where a plurality of operating systems are capable of operating in a plurality of modes, a register which is used by each operating system including a banked register whose area is allocated to each mode and a non-banked register shared by the modes, the apparatus comprising:
    an instruction detector configured to issue a first request for switching the operating systems when detecting a switching instruction regarding the operating systems;
    a switcher configured to issue a second request for saving and restoring the register when the switching instruction is detected, the second request specifying the operating system that is a switching source and the operating system that is a switching destination that are included in the first request;
    a save information manager configured to hold information about the mode in which the operating system is capable of operating, and information about the banked register and the non-banked register that are saved at a time of switching, among the registers used by the operating system;
    a banked register determiner configured to
        hold register information indicating which of the banked register and the non-banked register the register is,
        receive an acquisition instruction for the non-banked register or the banked register and the information about the mode, and
        return a list of the non-banked registers or a list of the banked registers used in the received mode;
    a saving register determiner configured to
        acquire the mode in which the operating system that is the switching source is capable of operating from the save information manager,
        determine that saving of the banked register for the mode is necessary when the operating system that is the switching source is capable of operating in the acquired mode, and when another operating system is capable of operating in the mode,
        acquire a list of the banked registers that need to be saved by transferring the information about the mode to the banked register determiner, and
        acquire a list of the non-banked registers from the banked register determiner; and
    a register saver/restorer configured to, in response to the second request,
        acquire the lists of the banked registers that need to be saved and the non-banked registers from the saving register determiner,
        acquire, from the save information manager, information about the register to be restored that was saved at a time of previous switching in the operating system that is the switching destination, and
        save and restore the register.

2. The apparatus according to claim 1, wherein
the saving register determiner is configured to receive information about whether a process interruption for the operating system occurs or not in the mode, and determine that saving of the banked register for the mode specified is unnecessary when the operating system that is the switching source is capable of operating in the mode at a time of the first request, when another operating system is capable of operating in the mode, and when the information received from the operating system that is the switching source indicates that there is no possibility of the process interruption.

3. The apparatus according to claim 1, further comprising:
an interrupt state manager configured to store settings regarding whether an interrupt is allowed or not for each mode of the operating system, and a state of an interrupt for each mode;
an interrupt detector configured to
    detect occurrence of the interrupt and notify the interrupt state manager of start of an interrupt process at the operating system that is an interrupt input destination, and
    detect end of the interrupt and notify the interrupt state manager of end of the interrupt process at the operating system that is the interrupt input destination; and
an interrupt policy determiner configured to detect a change in the settings regarding whether an interrupt is allowed or not, and update the interrupt state of the operating system that is the interrupt input destination,
wherein the saving register determiner is configured to
    acquire, from the interrupt state manager, the interrupt state of a mode for performing an interrupt process at the operating system that is currently being processed,
    determine that saving of the banked register is unnecessary when an interrupt is being processed and when an interrupt by another operating system in the same mode is impossible, and
    determine that saving of the banked register is necessary when the mode is other than the mode for performing an interrupt process or when the operating system is processing an interrupt and another operating system in the same mode is allowed to perform an interrupt.

4. The apparatus according to claim 1, further comprising:
a plurality of processors; and
a core manager configured to control the save information manager and the register saver/restorer for each of the processors.

5. The apparatus according to claim 3, further comprising:
a dynamic setting change detector configured to
    detect, for each operating system, a change in settings of whether operation in the mode is possible or not, and in settings of whether an interrupt is allowed or not for each mode,
    determine whether there is a possibility of the operating system that is a setting source destroying the banked register, and
    save the banked register when there is a possibility of destruction and when another operating system is using the banked register.

6. The apparatus according to claim 1, wherein
the saving register determiner is configured to
    receive, from the operating system, whether a security setting for the mode is valid or invalid, and determine that a value of the banked register needs to be cleared even when saving of the banked register is determined to be unnecessary when the security setting is valid, and the register saver/restorer is configured to clear the value of the banked register when clearing of the value of the banked register is determined to be necessary.

7. An information processing method for an information processing apparatus where a plurality of operating systems are capable of operating in a plurality of modes, a register which is used by each operating system including a banked register whose area is allocated to each mode and a non-banked register shared by the modes, the method comprising:

issuing a first request for switching the operating systems when detecting an switching instruction regarding the operating systems;

issuing a second request for saving and restoring the register when the switching instruction is detected, the second request specifying the operating system that is a switching source and the operating system that is a switching destination that are included in the first request;

managing save information by holding information about the mode in which the operating system is capable of operating, and information about the banked register and the non-banked register that are saved at a time of switching, among the registers used by the operating system;

determining the register
by holding register information indicating which of the banked register and the non-banked register the register is,
by receiving an acquisition instruction for the non-banked register or the banked register and the information about the mode, and
by returning a list of the non-banked registers or a list of the banked registers used in the received mode;

determining a saving register
by acquiring the mode in which the operating system that is the switching source is capable of operating,
by determining that saving of the banked register for the mode is necessary when the operating system that is the switching source is capable of operating in the acquired mode, and when another operating system is capable of operating in the mode,
by acquiring a list of the banked registers that need to be saved by transferring the information about the mode to a banked register determiner, and
by acquiring a list of the non-banked registers from the banked register determiner; and saving and restoring the register,
in response to the second request,
by acquiring the lists of the banked registers that need to be saved and the non-banked registers, and
by acquiring information about the register to be restored that was saved at a time of previous switching in the operating system that is the switching destination.

8. The method according to claim 7, further comprising:
in determining the saving register,
receiving information about whether a process interruption for the operating system occurs or not in the mode; and
determining that saving of the banked register for the mode specified is unnecessary when the operating system that is the switching source is capable of operating in the mode at a time of the first request, when another operating system is capable of operating in the mode, and when the information received from the operating system that is the switching source indicates that there is no possibility of the process interruption.

9. The method according to claim 7, further comprising:
managing an interrupt state by storing settings regarding whether an interrupt is allowed or not for each mode of the operating system, and a state of an interrupt for each mode;
detecting an interrupt by
detecting occurrence of the interrupt and notifying the interrupt state manager of start of an interrupt process at the operating system that is an interrupt input destination, and
detecting end of the interrupt and notifying the interrupt state manager of end of the interrupt process at the operating system that is the interrupt input destination; and
determining an interrupt policy by detecting a change in the settings regarding whether an interrupt is allowed or not, and by updating the interrupt state of the operating system that is the interrupt input destination, wherein
determining the saving register further comprises
acquiring, from the interrupt state manager, the interrupt state of a mode for performing an interrupt process at the operating system that is currently being processed,
determining that saving of the banked register is unnecessary when an interrupt is being processed and when an interrupt by another operating system in the same mode is impossible, and
determining that saving of the banked register is necessary when the mode is other than the mode for performing an interrupt process or when the operating system is processing an interrupt and another operating system in the same mode is allowed to perform an interrupt.

10. The method according to claim 7, further comprising:
managing a core by controlling managing the save information and by controlling saving and restoring the register for each of a plurality of processors.

11. The method according to claim 9, further comprising:
detecting a dynamic setting change by
detecting, for each operating system, a change in settings of whether operation in the mode is possible or not, and in settings of whether an interrupt is allowed or not for each mode,
determining whether there is a possibility of the operating system that is a setting source destroying the banked register, and
saving the banked register when there is a possibility of destruction and when another operating system is using the banked register.

12. The method according to claim 7, further comprising:
in determining the saving register,
receiving, from the operating system, whether a security setting for the mode is valid or invalid, and
determining that a value of the banked register needs to be cleared even when saving of the banked register is determined to be unnecessary when the security setting is valid; and
in saving and restoring the register, clearing the value of the banked register when clearing of the value of the banked register is determined to be necessary.

13. A computer program product comprising a computer-readable medium containing a program executed by a computer where a plurality of operating systems are capable of operating in a plurality of modes, a register which is used by each operating system including a banked register whose area is allocated to each mode and a non-banked register shared by the modes, the program causing the computer to execute:
- issuing a first request for switching the operating systems when detecting an switching instruction regarding the operating systems;
- issuing a second request for saving and restoring the register when the switching instruction is detected, the second request specifying the operating system that is a switching source and the operating system that is a switching destination that are included in the first request;
- managing save information by holding information about the mode in which the operating system is capable of operating, and information about the banked register and the non-banked register that are saved at a time of switching, among the registers used by the operating system;
- determining the register
  - by holding register information indicating which of the banked register and the non-banked register the register is,
  - by receiving an acquisition instruction for the non-banked register or the banked register and the information about the mode, and
  - by returning a list of the non-banked registers or a list of the banked registers used in the received mode;
- determining a saving register
  - by acquiring the mode in which the operating system that is the switching source is capable of operating,
  - by determining that saving of the banked register for the mode is necessary when the operating system that is the switching source is capable of operating in the acquired mode, and when another operating system is capable of operating in the mode,
  - by acquiring a list of the banked registers that need to be saved by transferring the information about the mode to a banked register determiner, and
  - by acquiring a list of the non-banked registers from the banked register determiner; and
- saving and restoring the register,
  - in response to the second request,
  - by acquiring the lists of the banked registers that need to be saved and the non-banked registers, and
  - by acquiring information about the register to be restored that was saved at a time of previous switching in the operating system that is the switching destination.

14. The computer program product according to claim 13, the program further causing the computer to execute:
- in determining the saving register,
  - receiving information about whether a process interruption for the operating system occurs or not in the mode; and
  - determining that saving of the banked register for the mode specified is unnecessary when the operating system that is the switching source is capable of operating in the mode at a time of the first request, when another operating system is capable of operating in the mode, and when the information received from the operating system that is the switching source indicates that there is no possibility of the process interruption.

15. The computer program product according to claim 13, the program further causing the computer to execute:
- managing an interrupt state by storing settings regarding whether an interrupt is allowed or not for each mode of the operating system, and a state of an interrupt for each mode;
- detecting an interrupt by
  - detecting occurrence of the interrupt and notifying an interrupt state manager of start of an interrupt process at the operating system that is an interrupt input destination, and
  - detecting end of the interrupt and notifying the interrupt state manager of end of the interrupt process at the operating system that is the interrupt input destination; and
- determining an interrupt policy by detecting a change in the settings regarding whether an interrupt is allowed or not, and by updating the interrupt state of the operating system that is the interrupt input destination, wherein
- determining the saving register further comprises
  - acquiring, from the interrupt state manager, the interrupt state of a mode for performing an interrupt process at the operating system that is currently being processed,
  - determining that saving of the banked register is unnecessary when an interrupt is being processed and when an interrupt by another operating system in the same mode is impossible, and
  - determining that saving of the banked register is necessary when the mode is other than the mode for performing an interrupt process or when the operating system is processing an interrupt and another operating system in the same mode is allowed to perform an interrupt.

16. The computer program product according to claim 13, further comprising:
- managing a core by controlling managing the save information and by controlling saving and restoring the register for each of a plurality of processors.

17. The computer program product according to claim 15, the program further causing the computer to execute:
- detecting a dynamic setting change by
  - detecting, for each operating system, a change in settings of whether operation in the mode is possible or not, and in settings of whether an interrupt is allowed or not for each mode,
  - determining whether there is a possibility of the operating system that is a setting source destroying the banked register, and
  - saving the banked register when there is a possibility of destruction and when another operating system is using the banked register.

18. The computer program product according to claim 13, the program further causing the computer to execute:
- in determining the saving register,
  - receiving, from the operating system, whether a security setting for the mode is valid or invalid, and
  - determining that a value of the banked register needs to be cleared even when saving of the banked register is determined to be unnecessary when the security setting is valid; and
- in saving and restoring the register, clearing the value of the banked register when clearing of the value of the banked register is determined to be necessary.

* * * * *